(12) United States Patent
Coish et al.

(10) Patent No.: US 8,199,469 B2
(45) Date of Patent: Jun. 12, 2012

(54) BATTERY

(75) Inventors: Robert L. Coish, Mountain View, CA (US); Ron Hopkinson, Campbell, CA (US); John Raff, Menlo Park, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 12/580,976

(22) Filed: Oct. 16, 2009

(65) Prior Publication Data

US 2010/0310916 A1 Dec. 9, 2010

Related U.S. Application Data

(63) Continuation-in-part of application No. 12/549,570, filed on Aug. 28, 2009.

(60) Provisional application No. 61/184,795, filed on Jun. 6, 2009.

(51) Int. Cl.
*G06F 1/16* (2006.01)
(52) U.S. Cl. .................................. 361/679.02
(58) Field of Classification Search .............. 361/679.02
See application file for complete search history.

(56) References Cited

U.S. PATENT DOCUMENTS

| | | | | |
|---|---|---|---|---|
| 4,258,596 A | * | 3/1981 | Bisbing et al. ................. 81/436 |
| 5,237,486 A | * | 8/1993 | LaPointe et al. ......... 361/679.27 |
| 5,302,110 A | | 4/1994 | Desai et al. |
| 5,531,950 A | | 7/1996 | Kimura et al. |
| 5,611,517 A | | 3/1997 | Saadi et al. |
| 6,068,946 A | * | 5/2000 | Zedell et al. .................. 429/100 |
| 6,179,122 B1 | | 1/2001 | Moncrief et al. |
| 6,218,041 B1 | * | 4/2001 | Barbier et al. .................. 429/96 |
| 6,532,152 B1 | * | 3/2003 | White et al. .................. 361/692 |
| 6,724,616 B2 | * | 4/2004 | Kuo et al. ................ 361/679.02 |
| 6,791,465 B2 | * | 9/2004 | Blagin et al. .................. 340/665 |
| 6,876,543 B2 | | 4/2005 | Mockridge et al. |
| 6,914,773 B2 | * | 7/2005 | Yang et al. ............... 361/679.02 |
| 6,967,833 B2 | | 11/2005 | Boykin et al. |
| 7,330,122 B2 | | 2/2008 | Derrick et al. |
| 7,522,889 B2 | | 4/2009 | Wulff et al. |
| 7,697,281 B2 | * | 4/2010 | Dabov et al. ............. 361/679.55 |
| 7,817,407 B2 | * | 10/2010 | Tanaka .................... 361/679.02 |
| 7,855,874 B2 | * | 12/2010 | Nakajima et al. ........ 361/679.02 |

(Continued)

FOREIGN PATENT DOCUMENTS

EP 0 683 026 B1 3/2001

(Continued)

OTHER PUBLICATIONS

Int'l Search Report dated May 10, 2011 from Int'l Application No. PCT/US2010/052563.

(Continued)

*Primary Examiner* — Lisa Lea Edmonds
(74) *Attorney, Agent, or Firm* — Womble Carlyle Sandridge & Rice LLP

(57) ABSTRACT

By being embedded in a portable computing device, a battery pack is made essentially inaccessible to unauthorized users, thereby allowing for a battery pack that can be made smaller and of lighter construction material, thereby facilitating greater component density within the portable computing device, lower cost to manufacture, and more environmentally secure. In another embodiment, the battery pack can take the form of a battery assembly formed of a single piece housing having a cantilever portion to provide additional stiffness.

11 Claims, 20 Drawing Sheets

U.S. PATENT DOCUMENTS

| | | | |
|---|---|---|---|
| 7,871,720 B2* | 1/2011 | Myers et al. | 429/123 |
| 2002/0048148 A1 | 4/2002 | Horiuchi et al. | |
| 2003/0048605 A1* | 3/2003 | Kyozuka et al. | 361/686 |
| 2003/0197111 A1 | 10/2003 | Morimoto et al. | |
| 2006/0002065 A1* | 1/2006 | Hua | 361/683 |
| 2006/0018087 A1* | 1/2006 | Mizuno et al. | 361/679 |
| 2006/0082956 A1 | 4/2006 | Garel et al. | |
| 2006/0109619 A1* | 5/2006 | Ito et al. | 361/683 |
| 2006/0268528 A1 | 11/2006 | Zadesky et al. | |
| 2007/0019372 A1* | 1/2007 | Wong et al. | 361/683 |
| 2007/0148537 A1* | 6/2007 | Nakatani et al. | 429/100 |
| 2007/0165373 A1 | 7/2007 | Merz et al. | |
| 2008/0081254 A1 | 4/2008 | Kim et al. | |
| 2010/0061040 A1* | 3/2010 | Dabov et al. | 361/679.01 |
| 2010/0061055 A1* | 3/2010 | Dabov et al. | 361/679.56 |
| 2010/0259891 A1* | 10/2010 | Tachikawa | 361/679.55 |
| 2010/0310931 A1* | 12/2010 | Coish et al. | 429/186 |
| 2011/0019353 A1* | 1/2011 | Tanaka | 361/679.09 |
| 2011/0089792 A1* | 4/2011 | Casebolt et al. | 312/223.2 |
| 2011/0090627 A1* | 4/2011 | Raff et al. | 361/679.02 |
| 2011/0090630 A1* | 4/2011 | Bergeron et al. | 361/679.26 |
| 2011/0090712 A1* | 4/2011 | Bergeron et al. | 362/612 |
| 2011/0091051 A1* | 4/2011 | Thomason et al. | 381/103 |

FOREIGN PATENT DOCUMENTS

| | | |
|---|---|---|
| EP | 0 911 717 B1 | 3/2003 |
| EP | 1 621 967 | 2/2006 |
| WO | WO 2009/126480 | 10/2009 |

OTHER PUBLICATIONS

Written Opinion dated May 10, 2011 from Int'l Application No. PCT/US2010/052563.

Partial Search Report dated Feb. 15, 2011 from Int'l Application No. PCT/US2010/052563.

Office Action for U.S. Appl. No. 12/549,570 dated Feb. 17, 2012.

* cited by examiner

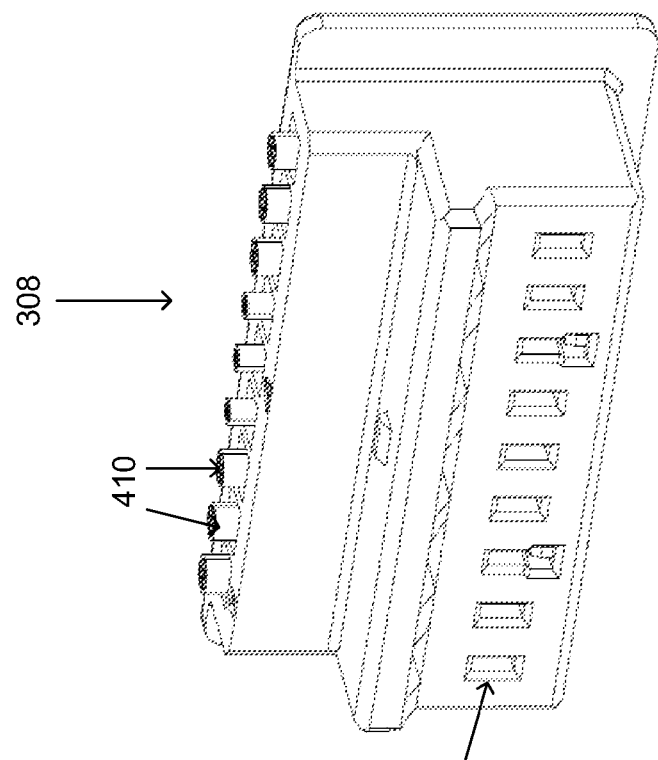
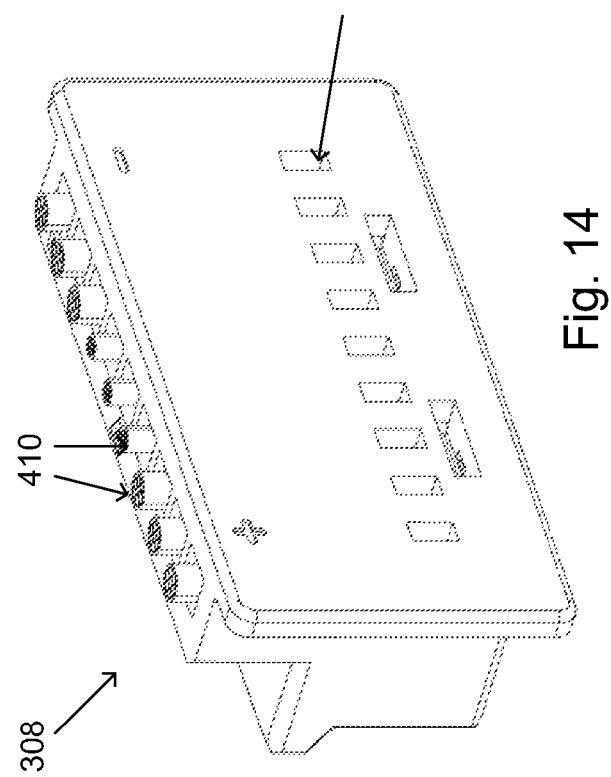

BATTERY

This patent application is a continuation in part of U.S. patent application Ser. No. 12/549,570 entitled "BATTERY PACK AND CONNECTOR" by Coish et al. filed Aug. 28, 2009 that claims the benefit of U.S. Provisional Patent Application No. 61/184,795, filed on Jun. 6, 2009, each hereby incorporated by reference herein in their entirety.

This patent application is related to and incorporates by reference in their entireties for all purposes the following co-pending patent applications filed concurrently herewith:
(i) U.S. patent application Ser. No. 12/580,914 entitled "PORTABLE COMPUTER DISPLAY HOUSING" by Bergeron et al.;
(ii) U.S. patent application Ser. No. 12/580,985 entitled "PORTABLE COMPUTER ELECTRICAL GROUNDING AND AUDIO SYSTEM ARCHITECTURES" by Thomason et al.;
(iii) U.S. patent application Ser. No. 12/580,946 entitled "PORTABLE COMPUTER HOUSING" by Casebolt et al.;
(iv) U.S. patent application Ser. No. 12/580,934 entitled "METHOD AND APPARATUS FOR POLISHING A CURVED EDGE" by Lancaster et al. that takes priority under 35 U.S.C. 119(e) to U.S. Provisional Patent Application Ser. No. 61/249,200 entitled "COMPLEX GEOGRAPHICAL EDGE POLISHING" by Johannessen filed Oct. 6, 2009 and is incorporated by reference in its entirety;
(v) U.S. patent application Ser. No. 12/580,881 entitled "SELF FIXTURING ASSEMBLY TECHNIQUES" by Thompson et al.;
(vi) U.S. patent application Ser. No. 12/580,922 entitled "COMPUTER HOUSING" by Raff et al.;
(vii) U.S. patent application Ser. No. 12/580,886 entitled "PORTABLE COMPUTER DISPLAY HOUSING" by Bergeron et al.; and
(viii) U.S. patent application Ser. No. 12/580,927 entitled "COMPUTER HOUSING" by Raff et al.

BACKGROUND

1. Field of the Invention

The present invention relates to small computers and, more particularly, to providing a compact battery pack capable of being embedded in a small computer, such as a laptop, notebook, etc.

2. Description of the Related Art

A battery pack is a set of any number of (preferably) identical batteries or individual battery cells. They may be configured in a series, parallel or a mixture of both to deliver the desired voltage, capacity, or power density.

Components of battery packs include the individual batteries or cells, and various interconnects which provide electrical conductivity between them. Rechargeable battery packs often contain a temperature sensor, which the battery charger uses to detect the end of charging. Interconnects are also found in batteries as they are the part which connects each cell, though batteries are most often only arranged in series strings.

Battery packs are widely used in portable applications such as laptop computers. However, it is important for any battery pack used in a laptop, notebook, or sub-notebook computer to be lightweight, sturdy, have high charge capacity, and compact. Moreover for a number of reasons it is advantageous for small computer manufacturers to be able to limit or entirely prevent unauthorized and/or unknowledgeable individuals from readily accessing the battery pack within the small computer. Such reasons, include for example, prevention of a user improperly disposing of battery packs that have outlived their usefulness, relaxation of mechanical requirements (such as a reduced need to meet a drop test consistent with a battery pack separated from the small computer being dropped). A typical user-removable battery should be able to withstand a one meter drop. That is, the battery should remain functional and safe after a one meter drop. Moreover, any battery made inaccessible to an unauthorized user can therefore be produced with thinner and lighter construction material since, unlike a battery pack removed from the small computer, the battery pack can be protected by the housing of the small computer and is therefore in less of a need to resist direct impacts from, for example, a drop event, direct blunt force, or exposure to moisture or other potentially corrosive material.

Therefore, a battery that can be embedded in a thin, lightweight portable computer system having large charge capacity that can also add to the structural integrity of the portable computer without adding undue weight is desired.

SUMMARY OF THE DESCRIBED EMBODIMENTS

Broadly speaking, the embodiments described herein relate to a lightweight, compact, high charge capacity battery assembly embeddable in a portable computing device.

In one embodiment, the battery assembly can be embedded in a portable computing device having a housing formed of flexible material. In the described embodiment, the battery housing can be formed from a single piece that can include a top portion arranged to provide protection to a plurality of battery components and to provide connectors for securing the battery to the housing. The battery housing can also include a cantilever beam portion integrally formed with the top portion and extending along a lower edge of the top portion, the cantilever beam portion arranged to enhance a resistance to flexing of the battery housing. The battery assembly can further include a lightweight minimum Z stack impact bottom layer attached to the cantilever beam portion and at least some of the battery components by way of a high bond adhesive, the lightweight bottom layer having a thickness that does not substantially impact the Z stack of the battery assembly.

A method of embedding a battery assembly into a portable computer having a computer housing formed of flexible material is disclosed. The method can be carried out by performing at least the following operations: receiving the battery assembly that can include a single piece battery housing arranged to enclose a plurality of battery cells. The battery housing formed to include a front portion with a curved cross sectional shape, a top portion, a cantilever beam portion, and a minimum Z impact protective layer. In the described embodiment, the cantilever beam portion can be integrally formed with a lower edge of the top portion to increase a resistance to flexing of the battery housing. The protective layer can be attached to the cantilever beam portion and the battery cells by way of a high bond strength adhesive. As configured, the battery assembly can be installed into the computer housing by at least placing the front portion snugly into a front frame attached to the computer housing, the front frame having a shape that can accommodate the curved cross sectional shape of the front portion. The battery assembly can then be placed onto an inside surface of the computer housing such that the protective layer is placed in contact with the inside surface of the computer housing. In this way, the computer housing provides a substantial portion of the protection afforded the battery cells. The front portion of the battery assembly can then be secured to the front frame.

In some embodiments, a back of the battery assembly can be secured to a rear frame attached to a rear portion of the housing. In this way, a load applied to the computer housing can be transferred by way of a load path to a structural support layer connected to the front and rear frames without substantially affecting the computer housing, the load path including the battery assembly.

A computing device is disclosed. The computer device having at least a flexible housing, a load transferring inner frame, a load absorbing layer arranged to mechanically couple the housing and the inner frame, a structural support layer connected to the load transferring inner frame; and a battery assembly mechanically connected to the load transferring inner frame, wherein when a load is applied to the flexible housing, the applied load is transferred by way of a load path to the structural support layer without substantially affecting the flexible housing, wherein the load path includes the battery assembly.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which:

FIGS. 14 and 15 are perspective views of the front and back of an electrical connector.

DETAILED DESCRIPTION OF THE DESCRIBED EMBODIMENTS

Broadly speaking, the described embodiments relate to a battery pack that can be embedded within a portable computing device, such as a laptop computer. The battery pack can have a high charge capacity and yet be sufficiently compact to provide for additional circuitry to be incorporated within a housing of the laptop computer while maintaining a thin profile of the portable computer. Moreover, by embedding the battery pack in the small computing device and making it substantially inaccessible to anyone but an authorized repair technician, the housing of the small computing device can provide additional protection to the battery pack since the battery pack can be considered to be an integral part of the small computing device. Therefore, by substantially eliminating unauthorized access (along with possible abuse by either negligence or lack of knowledge), the battery pack can be produced using lighter materials than would otherwise be required. The battery pack can also be customized to fit within the confines of the available space within the housing of the small computing device. In particular, by making the battery pack more compact as needed, more operational components can be assembled into the small computing device while still maintaining a thin profile.

Furthermore, by limiting access to the battery pack (or to the battery cells within the battery pack) to only authorized users, the environmental impact of improper disposal of battery packs can be minimized, if not completely eliminated. The restriction of battery pack access to only authorized users, such as a repair technician, can be accomplished by providing tamper resistant fasteners that fasten the battery pack to the housing of the computing device. In the described embodiments, the fasteners can only be removed using a special tool typically available only to authorized repair technicians. Furthermore, the battery pack cover (which would be that portion of the battery pack exposed to anyone opening the small computing device by removing a back portion of the small computer device housing) includes specially shaped recesses that limit access to the fasteners to a fastener tool that is designed to fit within the specially shaped recesses, thus making it even more difficult for an unauthorized user to gain access to the battery pack. According to one aspect, a battery pack includes an electrical connector suitable for connecting the battery cells in the battery pack to circuitry external to the battery pack.

Embodiments are discussed below with reference to FIGS. 1-16. However, those skilled in the art will readily appreciate that the detailed description given herein with respect to these figures is for explanatory purposes as the invention extends beyond these limited embodiments.

Figure 1:
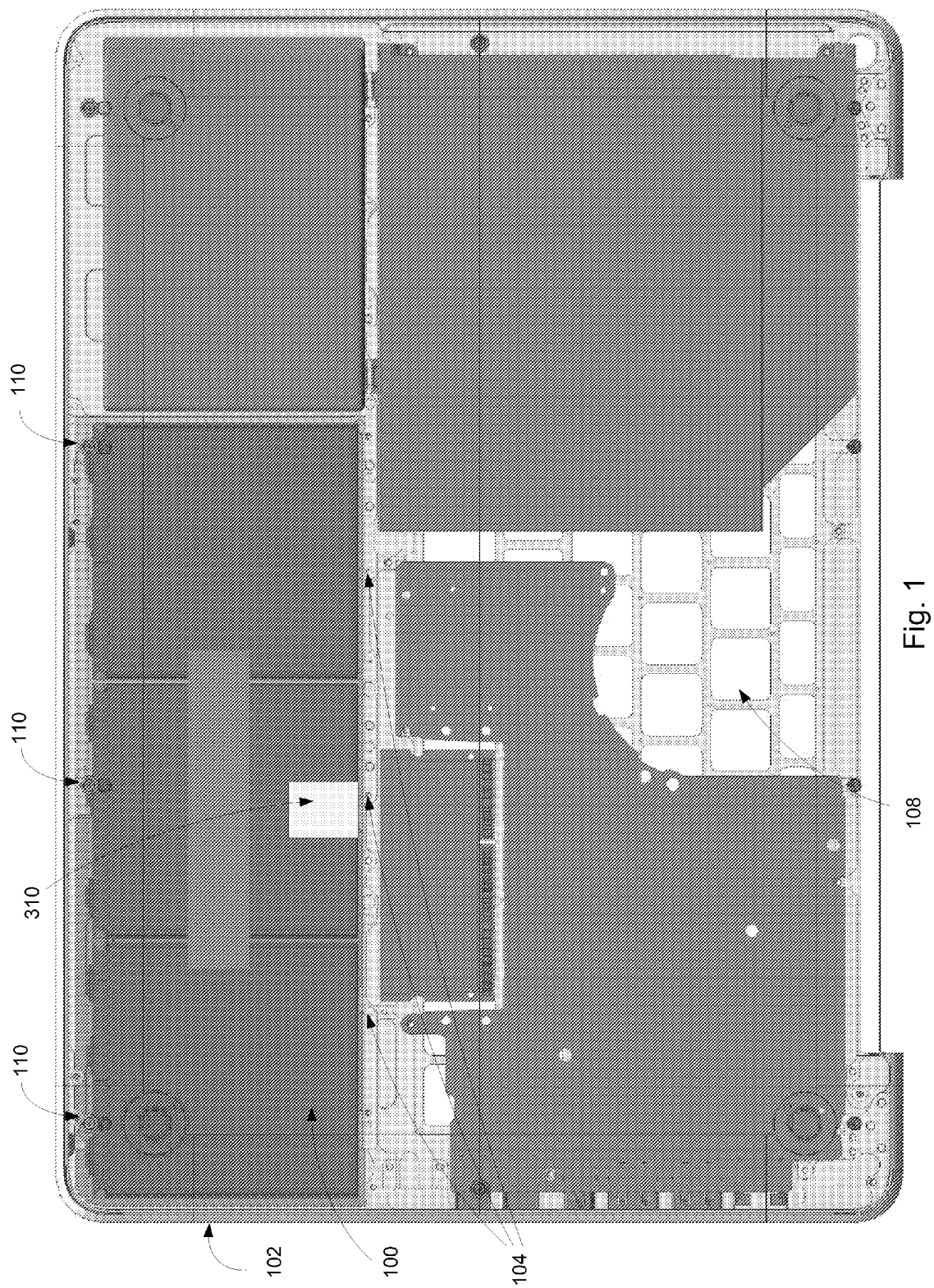
FIG. 1 is a top plan view showing a semi-transparent representation of an embodiment of a battery pack embedded in a front portion of a cut away view of a unibody housing for a laptop computer.

FIG. 1 shows a semi-transparent representation of the battery pack 100 in an exemplary laptop computer. FIG. 1 shows the front portion 102 of a computer housing in a cut away view of a laptop computer (in the cut away view, a removable back portion of the housing of the laptop computer has been removed for better visualization of the internal components, both structural and electronic). In the described embodiments, the battery pack 100 can be used to provide portable power for a laptop computer. Such laptop computers include, for example, a MacBook Pro manufactured by Apple Inc. of Cupertino, Calif. The battery pack 100 can provide all power required when the laptop computer is in a portable mode. In portable mode it is meant that the laptop computer is not connected to an external power supply, such as an AC outlet.

Figure 2:
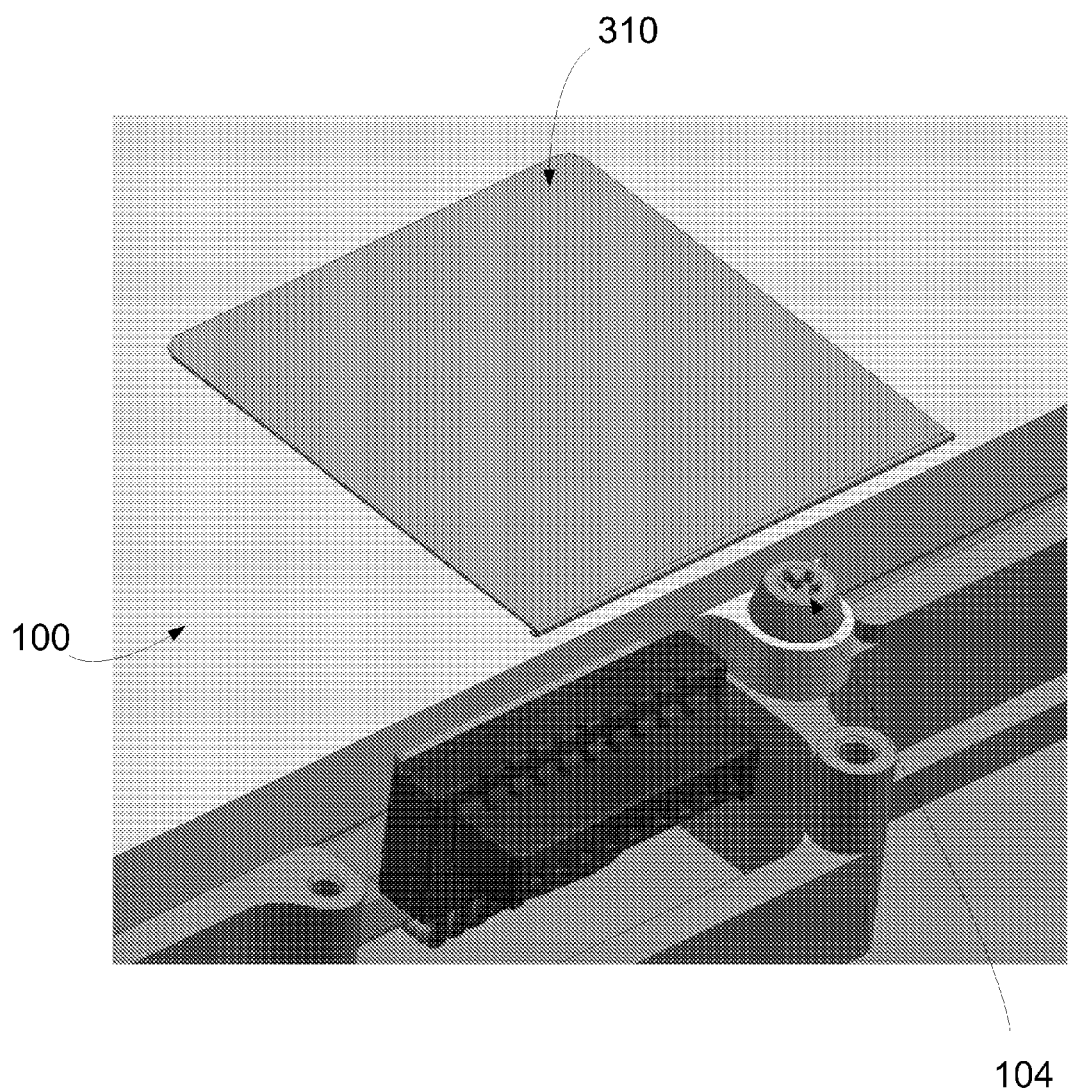
FIG. 2 is a detailed perspective view illustrating an embodiment of a tamper-resistant fastener.
Figure 3:
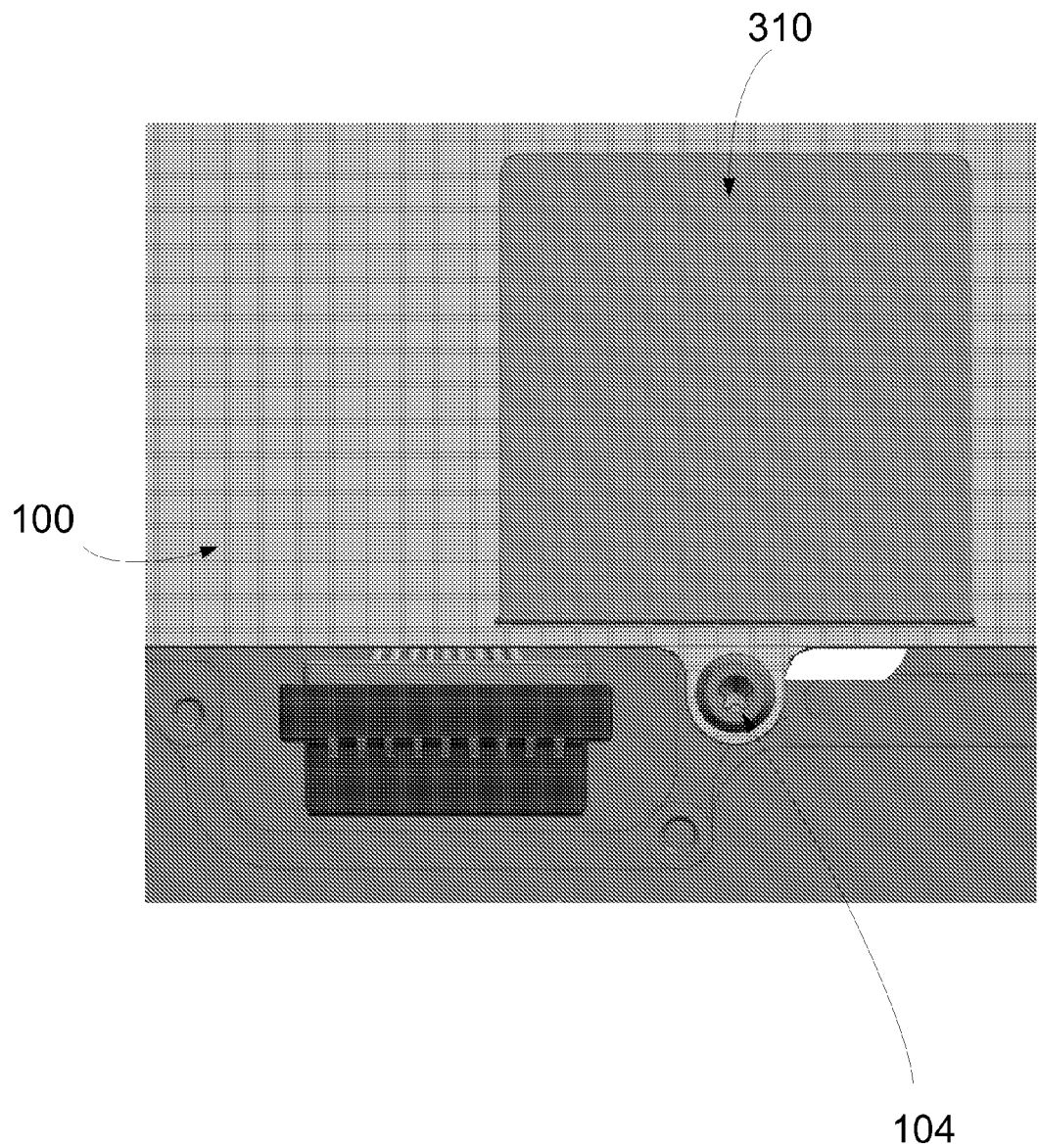
FIG. 3 is a detailed top plan view illustrating the embodiment of a tamper-resistant fastener shown in FIG. 2.
Figure 4:
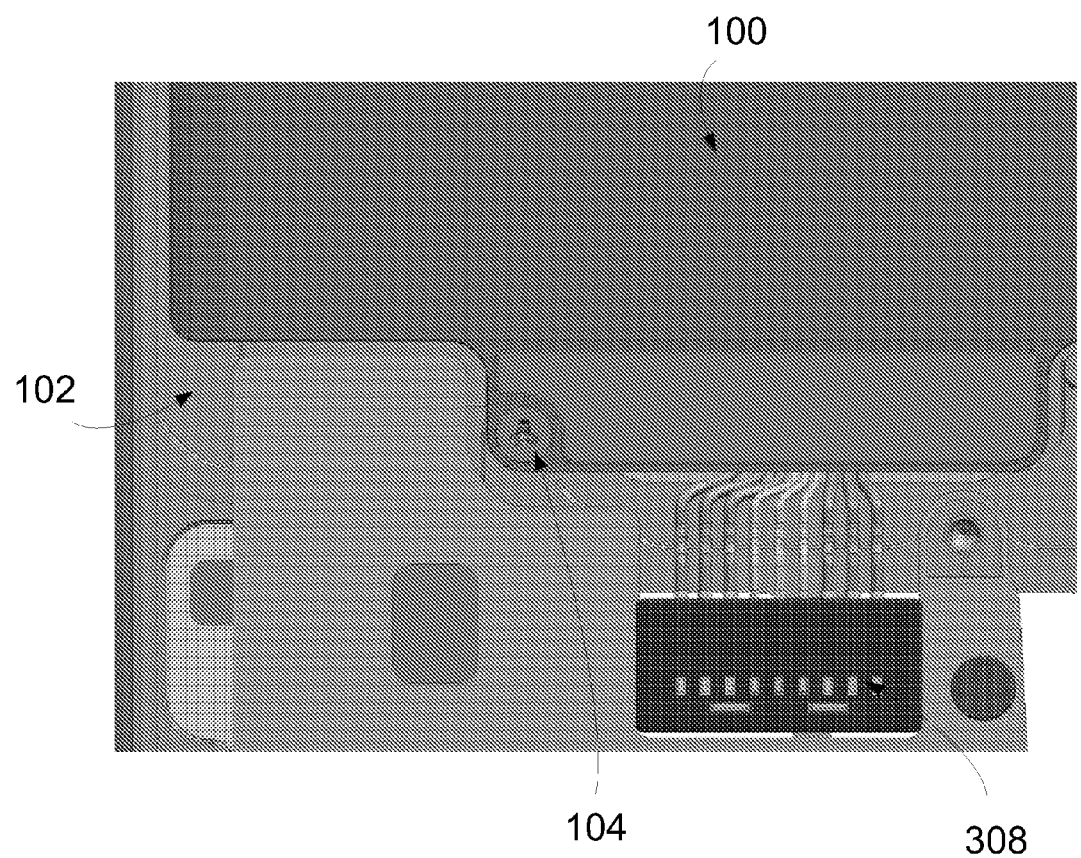
FIG. 4 is a detailed top plan view illustrating another embodiment of a tamper-resistant fastener.

Tamper-resistant fasteners 104 can be used to secure the battery pack 100 to the front portion 102 of the computer housing. A customized tool is required to manipulate the tamper-resistant fasteners 104. That is, the tamper-resistant fasteners are not configured to be manipulated by a conventional tool, such as a flat head or Phillips-head screwdriver or Allen wrench. FIGS. 2 and 3 illustrate an embodiment of a tamper-resistant fastener 104. As shown in FIGS. 2 and 3, this embodiment of the tamper-resistant fastener 104 has a head that is star-shaped. FIG. 4 illustrates another embodiment of a tamper-resistant fastener 104 with a head shaped like the letter "Y." It will be understood that other embodiments of the tamper-resistant fastener 104 can have other configurations such that the tamper-resistant fastener 104 cannot be manipulated by a conventional tool that is readily available to a typical user.

Figure 5:
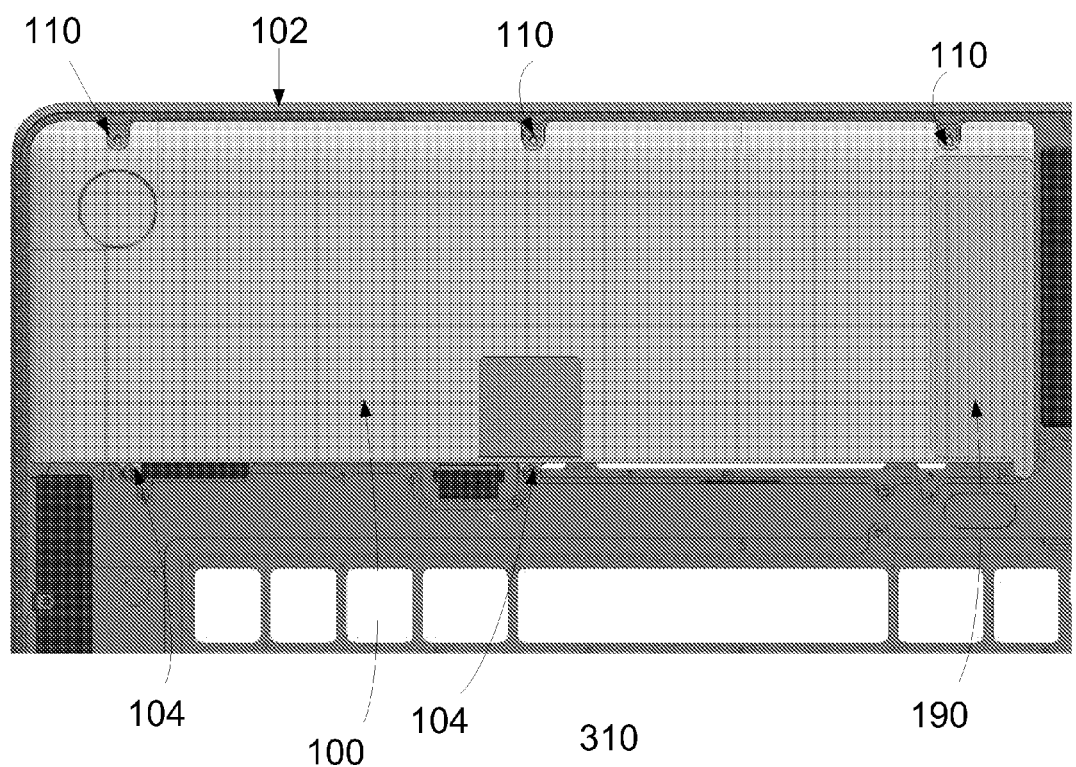
FIG. 5 is a top plan view of an embodiment of a battery pack, with a security tab, embedded in a front portion of a unibody housing for a laptop computer.
Figure 6:
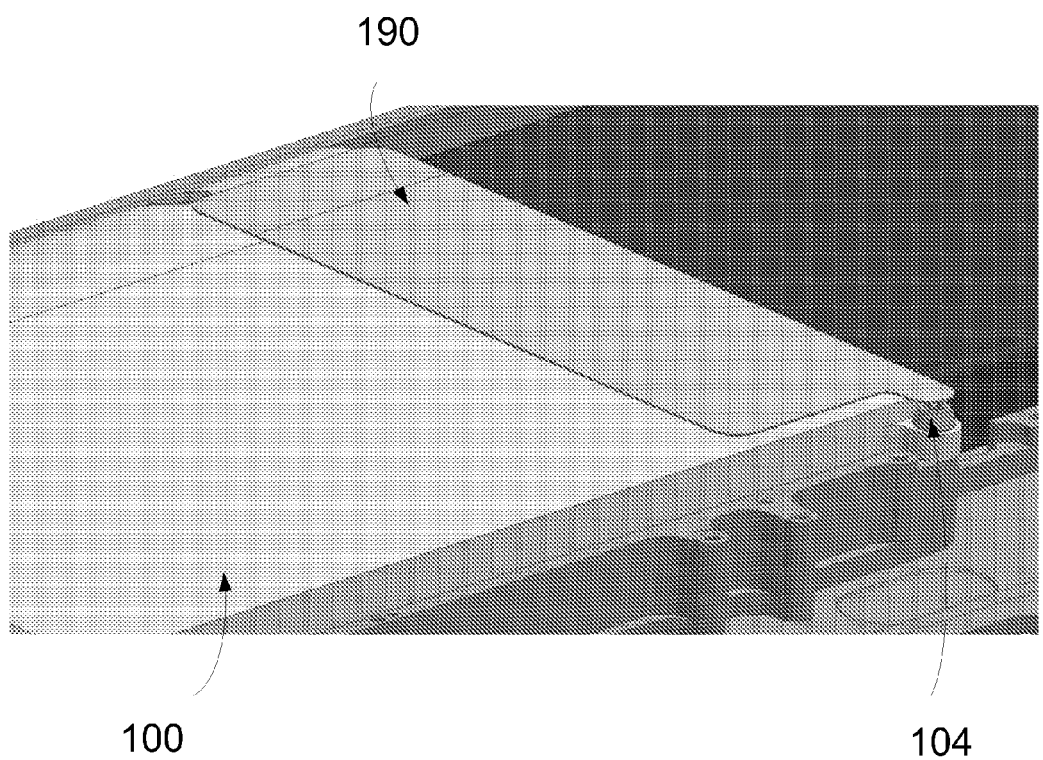
FIG. 6 is a detailed perspective view the security tab shown in FIG. 5.

In any case, since the battery pack 100 is securely attached to the front portion 102 of the computer housing the tamper-resistant fasteners 104, the battery pack 100 can only be detached from the housing 102 by undoing the tamper-resistant fasteners 104 using the special tool (not shown). In this way, even in those circumstances where the battery pack 100 has been exposed to the external environment (by removing the back portion of the housing), the battery pack cover cannot be removed without the proper tool. In this way, unauthorized users are dissuaded from tampering with the battery pack 100. Moreover, a security tab 190, as shown in FIGS. 5 and 6, can be attached to the battery pack 100 and configured to indicate if the battery pack 100 has been removed from the housing 102 in an unauthorized manner. As illustrated in FIGS. 5 and 6, a portion of the security tab 190 can cover one or more of the tamper-resistant fasteners 104. Thus, only two of the tamper-resistant fasteners 104 are visible in FIG. 5 because the third tamper-resistant fastener is under the security tab 190. For example, the security tab 190 can be an adhesive film that cannot be re-applied once it has been removed. Therefore, to gain access to the tamper-resistant fastener 104 underneath the security tab 190, one must peel away the security tab 190. A label, such as a warning label, may also be printed on the security tab 190.

It should be noted that the computer housing may be a unibody housing. That is, the front portion 102 of the computer housing can be formed from a single block of metal, such as aluminum, providing strength without the bulk of more conventional laptop housings. Similarly, the back portion of the housing can also be formed from a single block of metal. As can be appreciated by the skilled artisan, aluminum is a durable yet lightweight metal. However, in order to maintain this aesthetic look and feel of a laptop computer having a thin profile, the amount of space available within the laptop housing is severely constrained. This is especially true since the battery pack 100 must conform to the external dimensions of the housing. For example, the front portion 102 can accommodate a keypad by providing a keypad support structure 108 as well as a touch pad and its associated circuitry (not shown). Therefore, the battery pack 100 must conform to these external shape and space requirements while at the same time provide a high charge capacity, long duty cycle, and a long battery life. As discussed in more detail below, the battery pack 100 can be customized to fit in the specific dimensions dictated by these requirements.

Figure 7:
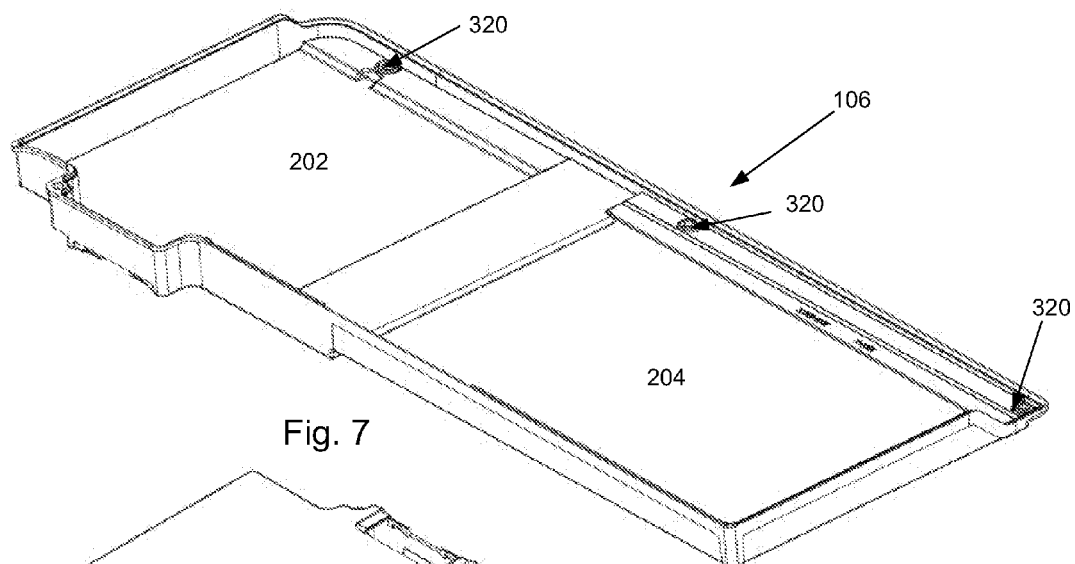
FIGS. 7 and 8 show top and bottom perspective views of a battery pack frame having a first portion and a recessed portion.
Figure 8:
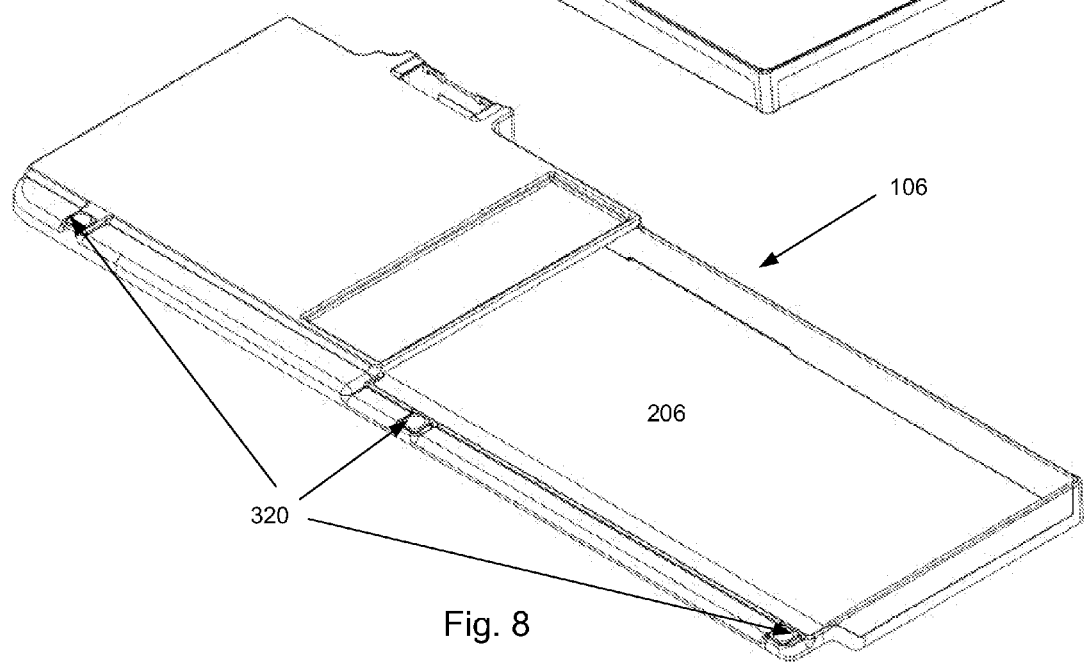

FIGS. 7 and 8 show top and bottom perspective views, respectively, of the battery pack frame 106, which can provide structural support for battery components 314. That is, FIG. 2 is a perspective view of the interior of the battery pack frame 106 and FIG. 3 is a perspective view of the exterior of the battery pack frame 106. As shown in FIG. 2, the battery pack frame 106 has a first portion 202 and a recessed portion 204. In the context of this discussion, the battery pack frame 106, first portion 202 and recessed portion 204 are designed to provide support for battery pack components 314, such as battery cells, electronics, etc. placed therein during a battery pack assembly operation. Once all such battery pack components 314 are placed within the respective cavities of the battery back frame 106, a battery pack cover 302, which is described in more detail below, can be positioned over and securely fastened to the battery pack frame 106.

Since the battery pack frame 106 can be placed in direct contact with the housing 102, there must be enough space available to accommodate a keyboard circuit (such as a keyboard membrane and associated circuitry) as well as the touch pad circuit and any other user interaction components and requirements dictated by the design and layout of the laptop computer. Therefore, a recessed portion 204 can be provided, which provides sufficient space for placement of the battery pack 100 within the front portion of the housing 102 with enough available space remaining to accommodate user interaction components, such as touch pad circuitry as well as any encroaching keyboard circuitry while still maintaining the thin profile of the device.

It should be noted that a thin profile has been found to be aesthetically pleasing to a large number of users and is therefore a desirable industrial design consideration in the manufacture of portable electronic devices, such as laptop computers. In the described embodiment, in order to protect battery pack components, such as sensitive electronics within the battery pack 100 as well as electrical connectors and battery cells, a protective layer 206 can be placed on the underside of the battery frame 106 over the battery pack components 314 in the recessed portion 204, as shown in FIG. 8. The protective layer 206 can be formed of any of a number of materials, such as stainless steel (SUS), MYLAR (a polyester film), etc. In the case where the protective layer is SUS or MYLAR, the layer can have a thickness on the order of about 0.1 mm in order to provide protection for battery pack components 314 contained in the recessed portion 204. This protective layer 206 can be thin because it is not user-accessible when the assembled battery pack 300 having a battery pack cover 302 is installed in the computer even if the back portion (not shown) of the computer housing is removed, as the protective layer 206 is on the underside of the battery pack frame 106 adjacent electrical components of the computer. As one of skill in the art will appreciate, a thin protective layer 206 allows more space for not only battery pack components 314 in the recessed portion but also for components of the computer.

Figure 9:
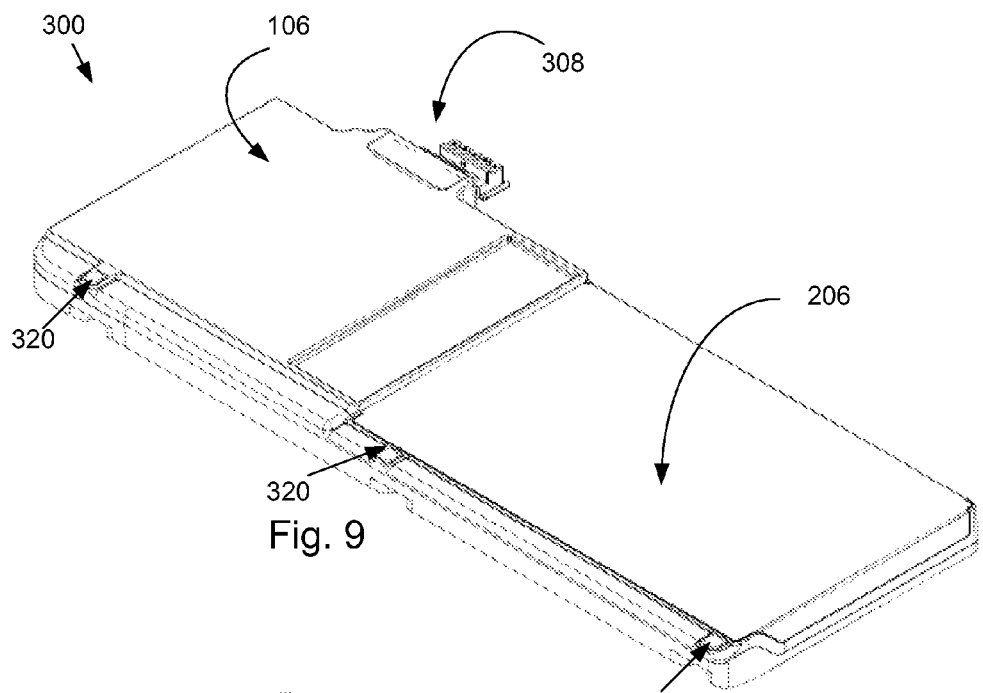
FIGS. 9 and 10 are top and bottom perspective views of an assembled battery pack.
Figure 10:
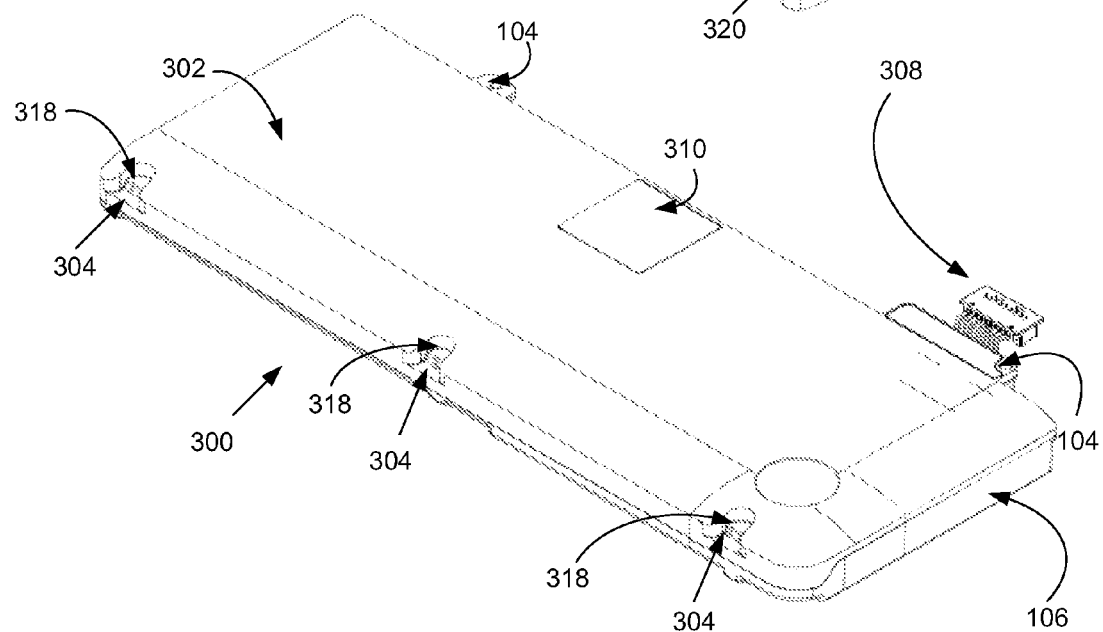

FIGS. 9 and 10 are top and bottom perspective views, respectively, of an assembled battery pack 300 having a battery pack cover 302 secured to the battery pack frame 106. In an embodiment, the battery pack cover 302 is laminated to the battery pack frame 106 to enclose the battery pack components 314. In another embodiment, the battery pack cover 302 is secured to the battery pack frame 106 with an adhesive. The battery pack frame 106 and the battery pack 302 can be injection molded to have adhesive channels and mating surfaces along the edges for applying adhesive to secure the two parts together to form an assembled battery pack 300 containing battery pack components 314 therein. Other methods of attaching the battery pack cover 302 to the battery pack frame 106 can also be used. For example, screws can be used to secure the battery pack cover 302 to the battery pack frame 106.

As shown in FIG. 10, tamper-resistant fasteners 104 are provided on the battery pack cover 302 to secure the assembled battery pack 300 to the front portion 102 of the computer housing such that the battery pack 300 can be removed only by an authorized technician, as discussed above. Although only two tamper-resistant fasteners 104 are shown in the embodiment illustrated in FIG. 10, it will be understood that the assembled battery pack 300 may have any number of tamper-resistant fasteners 104. For example, there are three tamper-resistant fasteners 104 in the embodiment shown in FIG. 1. It will be understood that any number of tamper-resistant fasteners 104 may be provided. In some embodiments, the tamper-resistant fasteners 104 are threaded through holes 330 (FIG. 12) in the battery pack cover 302 or the battery pack frame 106 or both. In other embodiments, the tamper-resistant fasteners 104 may be an integral part of the battery pack cover 302. The tamper resistant fasteners 104 may also be provided in specially shaped recesses in such a way as to prevent an unauthorized user from gaining meaningful access to the tamper resistant fasteners 104.

Figure 11:
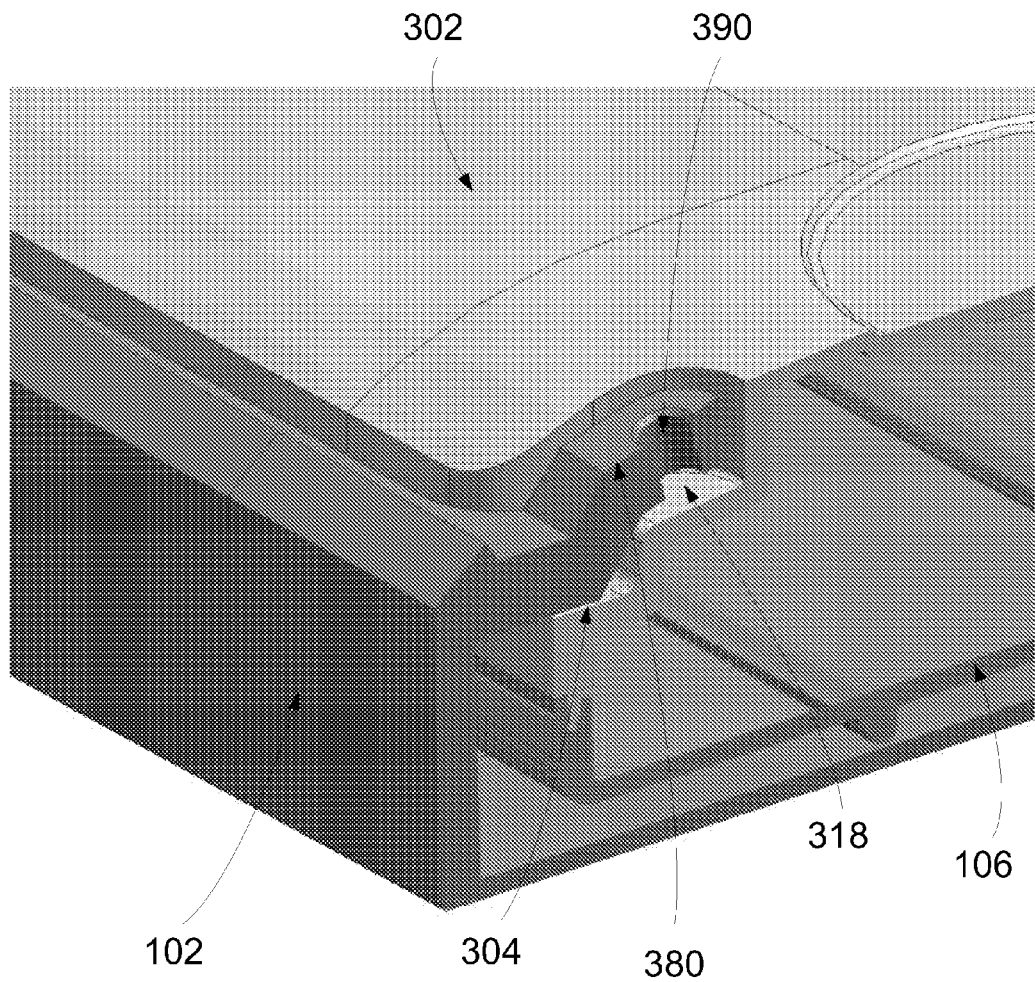
FIG. 11 is a perspective cross-sectional view of an embodiment of a battery pack embedded in a front portion of unibody housing for a laptop computer.

As shown in FIGS. 10 and 11, the battery pack cover 302 has a number of corresponding inserts 318 into which fasteners 110, such as conventional screws, may be inserted to attach the battery pack 100 to the front portion 102 of the computer housing. It will be understood that conventional screws may be threaded into the inserts 318 in certain embodiments and other types of fasteners, such as customized tamper-resistant fasteners 104, may be used to secure the battery pack 100 to the front portion 102 of the computer housing in these locations. In the illustrated embodiment, there are three such inserts 318 in the battery pack cover 302. In other embodiments, there may be more or fewer inserts 318.

As shown in the illustrated embodiment of FIG. 10, the inserts 318 in the battery pack cover 302 are each seated in a recess 304. The recesses 304 allow the battery pack 100 to be placed into the front portion 102 of the housing such that a corresponding tab 380 of the housing is inserted into each of the recesses 304, as shown in FIG. 11. Each of the tabs 380 can have a through-hole 390 corresponding to the insert 318 of the battery pack cover 302. Once in place, the screws 110 (or other type of fasteners) may be tightened to help secure the battery pack 100 to the front portion 102 of the housing. It will be understood that, according to this embodiment, the battery pack 100 is installed by first inserting the end with the inserts 318 into the computer such that the tabs 380 of the housing are inserted into the recesses 304. In some embodiments, the recesses 304 can be specially shaped recesses that accommodate the fasteners 110 in such a way as to prevent an unauthorized user from gaining meaningful access to the fasteners 110.

Figure 12:
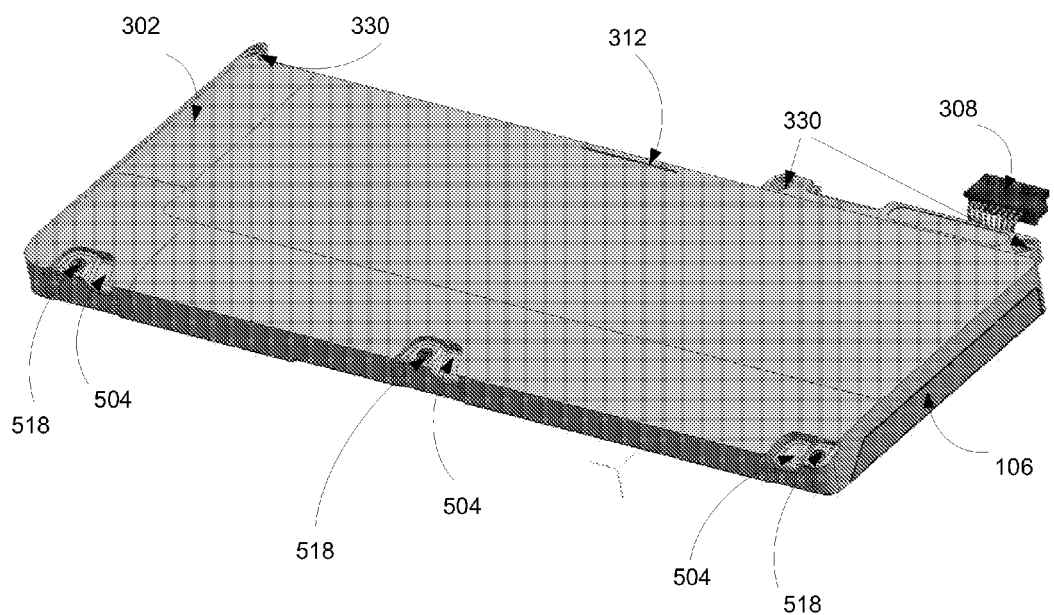
FIG. 12 is an embodiment of a battery pack having an insert in a recess to help secure the battery pack to a back portion of a unibody housing for a laptop computer.

In some embodiments, as shown in FIGS. 7-9, the battery pack frame 106 can have a number of compressible feet 320, which can be formed of a rubber material, to provide an interference fit of the recesses 304 and the tabs 380 of the front portion 102 of the computer housing. In still other embodiments, fasteners are not used for securing the battery pack 100 to the front portion 102 in these locations, but rather for securing the front portion 102 to the back portion (non shown) of the computer housing. That is, a fastener is threaded through the through-hole 390 in the tab 380 of the front portion 102 of the housing and through a corresponding through-hole in the back portion (not shown) of the housing. FIG. 12 shows another embodiment of a battery pack in which inserts 518 are incorporated in recesses 504 to help secure the battery pack 300 to the back portion (not shown)) of the housing. It will be understood that either tamper-resistant fasteners 104 or conventional screws 110 may be used in these locations.

Figure 13:
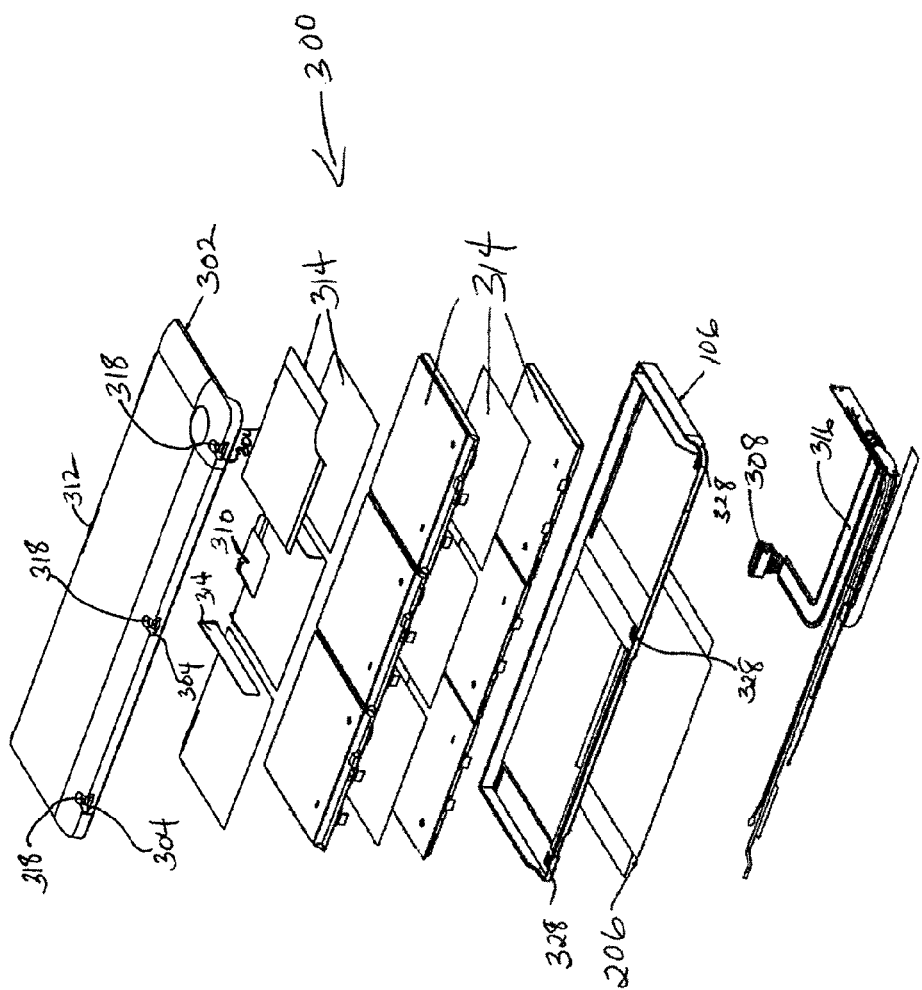
FIG. 13 is an exploded perspective view of an assembled battery pack.

FIG. 13 is an exploded perspective view of an embodiment of the assembled battery pack 300. Although the cables 316 associated with the electrical connector 308 are illustrated as being positioned underneath the battery pack frame 106 in this embodiment, the skilled artisan will appreciate that the cables 316 could be positioned between the battery pack frame 106 and battery pack cover 302 or even over the top of the battery pack cover 302 in other embodiments.

In the described embodiment, the battery pack cover 302 can be placed within the housing 102 in such a way that when the back portion (not shown) of the computer housing is removed, it is the battery pack cover 302 that is exposed to the external environment. Accordingly, the battery pack cover 302 can be formed of a durable material, such as high impact plastic or other suitably rugged yet lightweight material. The battery pack frame 106 and battery pack cover 302 can both be injection molded plastic, such as PC/ABS plastic. In some embodiments, the battery pack frame 106 and battery pack cover 302 can have a thickness in a range of about 0.35 mm to about 1.3 mm. In other embodiments, the battery pack frame 106 and battery pack cover 302 can have a thickness in a range of about 0.6 mm to about 0.65 mm. In this way, when the back portion of the computer housing is removed, an authorized user can only remove the fasteners 104 with an appropriately shaped tool available only to authorized technicians. The durable material of the battery pack cover 302 is capable of protecting the battery cells from incidental damage.

However, the material of the battery pack cover 302 need not be as durable and rugged as the material used for conventional laptop battery packs because the battery pack 100 cannot be removed by a typical user who does not have access to the special tool required for the fasteners 104. Thus, the battery pack 100 need not meet a stringent drop test. Furthermore, because a user cannot remove the battery pack 100 without a customized tool, the battery pack 100 does not need additional mechanisms, such as latches, that are typically included in a conventional battery pack designed to be removed and inserted by a user. Without these additional mechanisms, the battery pack 100 can be made even smaller, or the battery pack 100 can accommodate larger battery cells and thereby increase charge capacity. Furthermore, because the battery pack 100 can last as long as about eight hours and can be recharged as many as about 1000 times, there is less need for a user to replace the battery pack 100.

As shown in the illustrated embodiments, the assembled battery pack 300 can have a substantially rectangular shape. According to an embodiment, the battery cell or cells within the battery pack 300 can have a customized size and shape designed to fit inside a housing 102 having a thin profile. The thickness of a conventional battery pack is typically dictated by the diameter of the cylindrical lithium-ion cells contained within the battery pack. Also, the space between the cylindrical cells is wasted in a conventional battery pack. However, the battery cells, according to this embodiment, can be customized such that there is no wasted space between cells and the thickness of each cell can be customized to fit in the designated space within the battery pack 300, thereby maintaining the overall volume of the battery cells even through the cells are thinner. The thickness of the computer housing is therefore not dictated by the size of the battery cells, whether cylindrical or otherwise. According to some embodiments, the computer has a housing (front portion 102 and back portion (not shown)) that is thinner than a conventional lithium-ion cell. For example, a conventional lithium-ion cell is a cylindrical cell with a 18 mm diameter. However, the thickness of housing (front portion 102 and back portion (not shown)) of a laptop computer containing a battery pack 100, as described herein, can have a thickness of about 16 mm or less. The battery packs 100 described herein can have thicknesses in a range of about 5 mm to about 14 mm.

As discussed above, the battery cells within the battery pack 100 are capable of having a high charge capacity, which translates into longer running time and less need to swap a depleted battery for a fully charged battery. By removing the bulky housing of a typical battery pack, the battery pack can have a larger volume, and therefore, have a higher charge capacity, while maintaining a thin profile. Furthermore, embedding the battery pack 100 within the computer so that it cannot be removed by the user removes the need for a battery door on the computer housing, thereby simplifying the manufacture of the computer housing as there is no need for a battery door and its associated latches, hinges, etc. In one embodiment, the battery pack 100 is capable of providing power to a laptop computer for up to about eight hours and can be recharged up to about 1000 times, thereby providing a longer lifespan for the battery pack 100. As the skilled artisan will readily appreciate, one recharge is a complete charge and discharge of a battery's energy. The longer lifespan of the battery pack 100 also makes it more environmentally friendly than conventional battery packs, which are designed to be replaced after a couple of years. With the use of the longer lifespan battery packs 100 described herein, fewer batteries will be discarded. The tamper-resistant feature also makes it more difficult for a user to simply remove the battery and improperly discard the battery without recycling it. It will be understood that although that battery pack is not user-removable, the user can still have access to other electronic components of the computer if the back portion of the computer housing is removed. The battery pack 100 can have an energy capacity of at least 60 watt hours. In another embodiment, the battery pack 100 can have an energy capacity of at least 73 watt hours. In still another embodiment, the battery pack 100 can have an energy capacity of at least 94 watt hours.

The assembled battery pack 300 can be used to provide support for the individual batteries or cells and various interconnects that provide electrical conductivity between them. In order to communicate with circuits external to the battery pack 100, an electrical connector 308 is used. For example, the electrical connector 308 can be connected to the motherboard of the computer. In this way, power can be delivered from battery cells within the battery pack 100 to external circuits in the computer. Moreover, external power can be provided by way of the electrical connector 308 to the battery cells within battery pack 100 from an external power supply. Such external power can be used at least for recharging of the battery cells within battery pack 100. The skilled artisan will understand that the configuration and position of the electrical connector 308 on the assembled battery pack 300 will depend on the specific configuration of the electrical components to which it is connected, and that such configuration may differ from one computer to another.

FIGS. 14 and 15 are perspective views of the front and back of an embodiment of an electrical connector 308. The electrical connector 308 can be used to electrically couple the battery pack 100 to electrical components of the computer external to the battery pack 100. That is, the electrical connector 308 connects circuits external to the battery pack 100 with the circuits and battery cells internal to the battery pack 100.

When the battery pack 100 is installed in the computer, the electrical connector 308 can be coupled to the electrical components of the computer before inserting the battery pack 300 into the designated space within the housing of the computer. Thus, the electrical connector 308 is under the battery pack 300 and is not user-accessible. Once inserted into the designated space, the tamper-resistant fasteners may be implemented to secure the battery pack 300 to the front portion 102 of the housing. Thus, once the battery pack 300 is installed in the computer, the electrical connector 308 and its associated wires and cables 316 are protected underneath the battery pack 300 even when the back portion of the computer housing is removed and the battery pack 300 is exposed. In the illustrated embodiment, the electrical connector 308 has nine pin connection receptors, 400 for coupling to the electrical components of the computer. According to another embodiment, the battery connector has 13 pin connection receptors 400. As shown in FIGS. 8 and 9, there are also a number of connectors 410 for coupling to the battery pack 300 via wires and cables 316.

Figure 16:
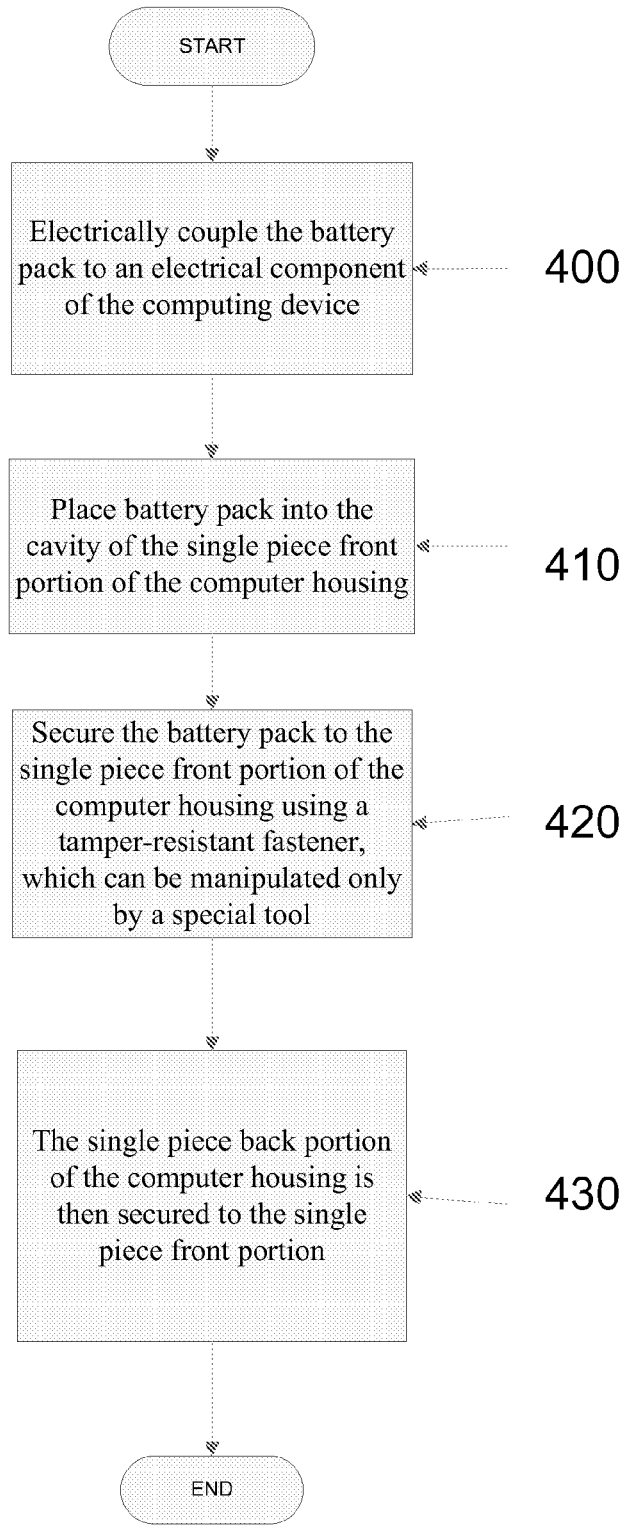
FIG. 16 is a flow chart of a method of embedding an assembled battery pack into a computing device housing.

FIG. 16 is a flow chart of a method of embedding an assembled battery pack 300 into a computing device having a housing comprising a single piece back portion and a single piece front portion. As discussed above, the assembled battery pack 100 has a battery pack frame 106 securely fastened to a battery pack cover 302 by at least one tamper-resistant fastener 104. The single piece front portion 102 has a cavity into which internal components are placed during assembly and also provides support for a plurality of user interaction components. In step 400, the battery pack 300 is electrically coupled to an electrical component of the computing device. The battery pack 300 is then placed into the cavity of the single piece front portion 102 in step 410. After the battery pack 300 is positioned in the cavity, the battery pack 300 is secured to the single piece front portion 102 using the tamper-resistant fastener 104, which can be manipulated only by a special tool in step 420. The single piece back portion of the computer housing is then secured to the single piece front portion 102 in step 430.

It will be understood that, in other embodiments, the battery pack 300 can be electrically coupled to an electrical component of the computing device after the battery pack 300 is placed into the cavity of the single piece front portion 102. That is, the order of the steps 400 and 410 can be reversed.

As shown in the illustrated embodiments, a pull tab 310 may be provided on the assembled battery pack 300 to aid an authorized technician in removing the assembled battery pack 300 from the housing 102 after the tamper-resistant fasteners 104 are removed. It will be understood that, in the illustrated embodiment, the fasteners 110 should also be removed before the pull tab 310 is used to first remove the battery pack 300. As shown in FIG. 13, the pull tab 310 can be attached to a battery component and threaded through a slot 312 in the battery pack cover 302. According to an embodiment, the pull tab 310 is capable of supporting the weight of the computer.

ADDITIONAL EMBODIMENTS

Broadly speaking, the described embodiments relate to a battery assembly that can be embedded within a portable computing device, such as a laptop computer. The battery assembly can have a high charge capacity and yet be sufficiently compact to provide for additional circuitry to be incorporated within a housing of the laptop computer while maintaining a thin profile of the portable computer. Moreover, by embedding the battery assembly in the small computing device and making it substantially inaccessible to anyone but an authorized repair technician, the housing of the small computing device can provide additional protection to the battery assembly since the battery assembly can be considered to be an integral part of the small computing device. The battery assembly can also be customized to fit within the confines of the available space within the housing of the small computing device. In particular, by making the battery assembly more compact as needed, more operational components can be assembled into the small computing device while still maintaining a thin profile.

Furthermore, the battery assembly can include battery cells, or core pack, enclosed in a battery housing having a stiffness enhancing shape. At least a portion of the battery housing can have a shape that conforms to the shape of an interior portion of the computer housing in contact with the battery assembly. The battery assembly can be dropped into the computer housing and then in motion referred to as diving in, the battery assembly is placed in close proximity to the corresponding interior portion of the computer housing. In this way, the battery housing and the computer housing can be integrally coupled in such as way that the flexibility of the computer housing can be increased. Accordingly, by not having to rely solely upon the stiffness of the material used to form the computer housing, it is possible that the computer housing can be formed of material such as plastic that is flexible and conventionally thought of as being unsuitable for use in supporting and protecting a computer assembly.

In one embodiment, the battery housing is a single piece housing having a cantilever beam portion integrally formed along a bottom length of a top cover of the battery housing (presenting a cross sectional shape that can resemble the letter "C"). The cantilever beam portion having a higher moment of inertia and therefore presenting a greater resistance to bending than that of a conventional battery housing without the cantilever beam portion. Moreover, since the battery housing is formed of a single piece of hard, durable material such as PCABS, no glue or other adhesive is used. In this way, there are no seams or other joints that could weaken or otherwise reduce the structural integrity of the battery housing. Since the battery assembly is embedded, then only the top portion of the battery housing is exposed when a bottom cover of the computer housing is removed. Therefore, a bottom portion of the battery housing is protected by the computer housing and requires only a thin, protective layer. The protective layer can be attached to the cantilever beam portion and the core pack using an adhesive, such as VHB (very high bond) adhesive such as tape. The protective layer can be formed of lightweight and compliant material such as MYLAR (a polyester film). Furthermore, by being thin, the protective layer can have little or no impact on the Z stack of the battery assembly.

Figure 17:
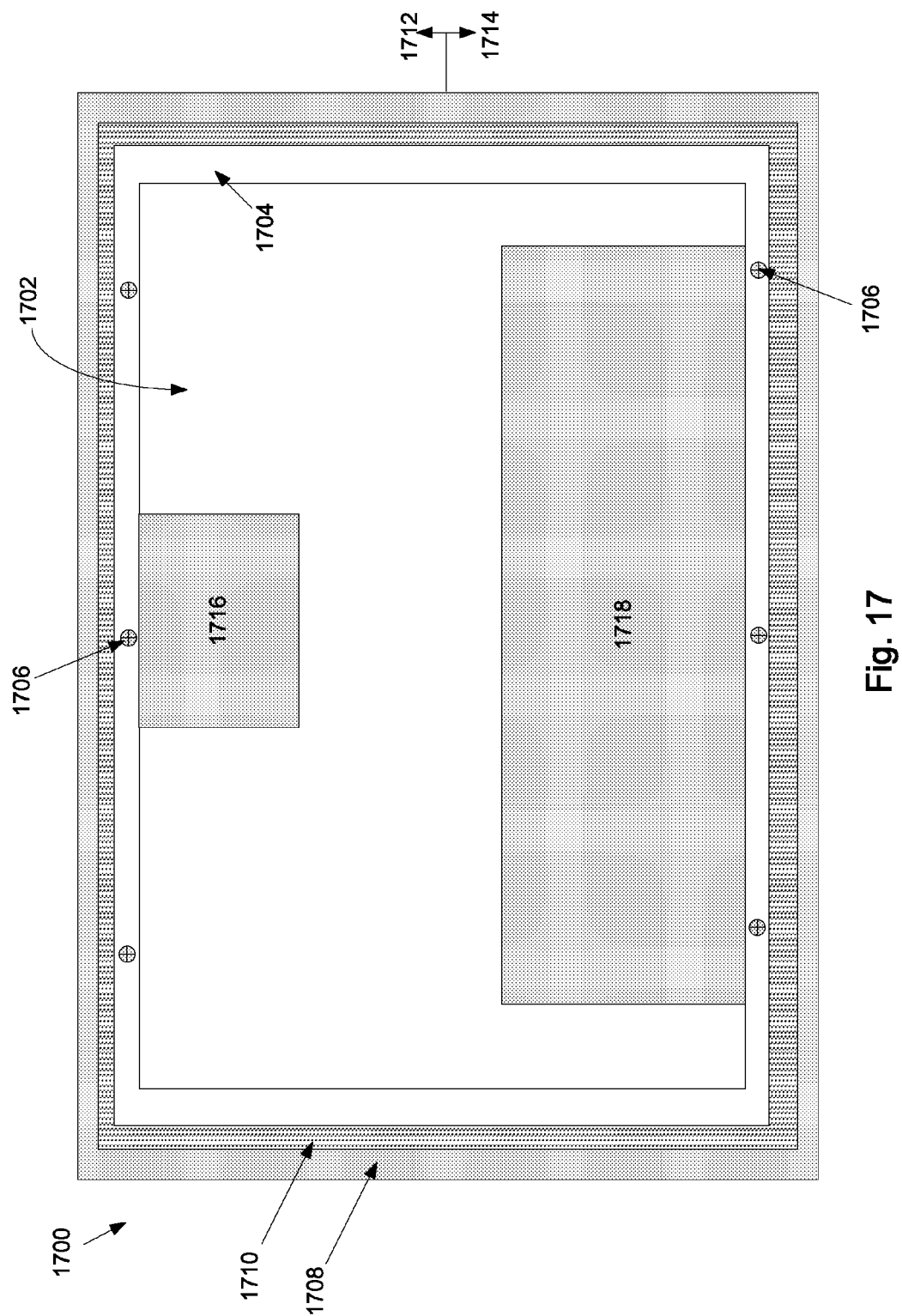
FIG. 17 shows a battery in accordance with another embodiment.

FIG. 17 shows housing 1700 in accordance with the described embodiments. Housing 1700 can form enclosure 1702 suitable for accommodating a computer assembly. More specifically, FIG. 17 shows a representation of enclosure 1702 in an orientation suitable for receiving components used to form the computer assembly during a component installation operation. The computer assembly can include a plurality of operational components, such as a main logic board (MLB), hard disc drive (HDD), optical disc drive (ODD) and so on used in the operation of a computing system. The computing system can be a desktop or portable, however, for the remainder of this discussion, the described embodiments relate to a portable computing system without any loss of generality. Housing 1700 can include a structural support layer that in the finished product covers enclosure 1702 and is therefore not shown in FIG. 17. The structural support layer is typically connected to inner layer 1704 and only after installation of operational components into enclosure 1702 is complete.

However, after the installation of computer assembly is complete, the structural support layer can be used to cover the components assembled into enclosure 1702 by, for example, placing the structural support layer in contact with inner layer 1704. Inner layer 1704 can then be physically connected to the structural support layer at a plurality of connecting points 1706 by way of fasteners that can include screws, rivets, etc. It should be noted that there can be any number and/or combination of types of fasteners used depending upon, of course, the particular design. By securely fastening inner layer 1704 to the structural support layer, the fasteners at connecting points 1706 can be used to transfer load L from inner layer 1704 to the structural support layer without substantially affecting outer layer 1708. Outer layer 1708 can be attached to and supported by inner layer 1704 by way of adhesive 1710 that can absorb or otherwise prevent a load on inner layer 1704 from transferring to outer layer 1708. In this way, outer layer 1708 can be acoustically isolated from inner layer 1704 in that outer layer 1708 is essentially unaffected by a load on inner layer 1704.

Inner layer 1704 can be used to transfer loads to the structural support layer without affecting outer layer 1708. As a result, outer layer 1708 can be formed of material such as lightweight plastic not particularly suitable for carrying a load or believed by the conventional arts to be suitable for use as a computer housing. Therefore, in order to provide the requisite stability, the structural support layer can be formed of materials such as metal (such as aluminum formed in a stamping operation) or composite materials whereas outer layer 1708 can be formed of materials that are chosen for their aesthetic appeal and rather than for their ability to act as a load bearing structural component. Therefore, the choice of materials that can be used to form outer layer 1708 can be widely varied. A product designer can create a look and feel for the portable computer well beyond anything realistically possible with a conventional computer housing. For example, outer layer 1708 can be formed of light weight plastic and molded into any shape (such as an undercut shape) that can also be widely varied. For example, outer layer 1708 can present a continuous spline profile so as to appear to an observer to be a single unified shape with substantially no discontinuities. Outer layer 1708 can be formed of, for example, plastic such as PCABS.

It should be noted that the functional layout of the portable computing device can be used to enhance the ability of inner layer 1704 to transfer and distribute loads. In one embodiment, enclosure 1702 can be thought of being apportioned into a number of regions based upon the operational components and their respective structural characteristics. For example, if enclosure 1702 corresponds to a laptop computer, then enclosure 1702 can be thought of as having front portion 1712 suitable for accommodating features such as a user interface along the lines of a touch or track pad and rear portion 1714 for accommodating a keyboard, for example. The touch pad can be structurally supported by corresponding frame structure 1716 whereas the keyboard can be supported by rear frame 1718 each of which can be mounted to housing 1700 using, for example, adhesive. Both frame structure 1716 and rear frame 1718 can be formed of strong, rigid material such as metal in the form of aluminum, magnesium, and/or magnesium alloy.

Some of the internal components can be load bearing components while other components can be non-load bearing components. In the context of this discussion, a load bearing component can be thought of as one that can accommodate an external load without substantially affecting its operational or structural properties. Conversely, a non-load bearing component cannot carry an external load without a substantial likelihood of adversely affecting its form or function. For example, a hard disk drive (HDD) can be very sensitive to applied loads and must therefore be protected from an external load. In some cases, a component can be used to enhance the load handling capability of inner layer 1704 as well as to augment the stiffness of outer layer 1708.

Figure 18:
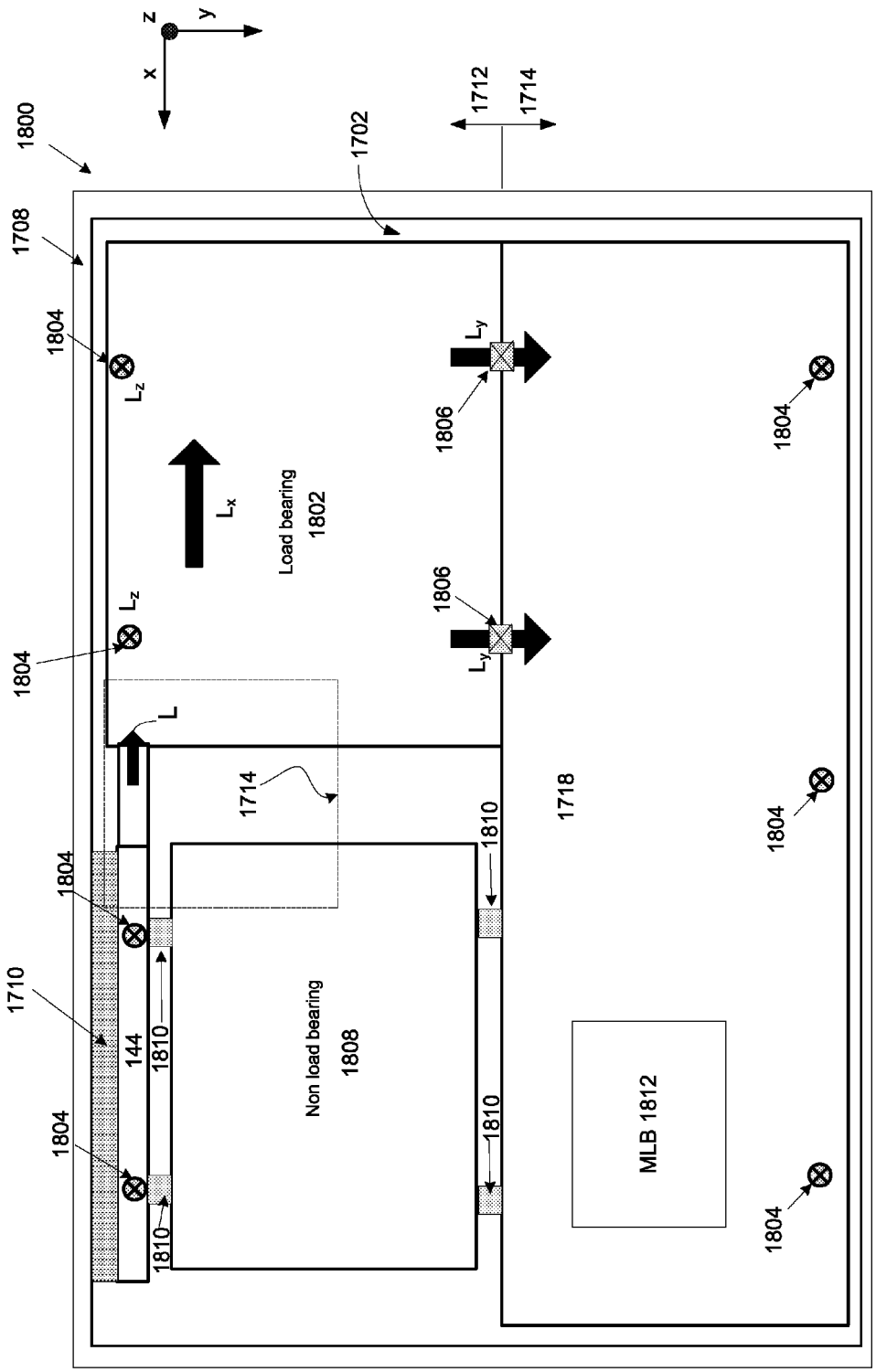
FIG. 18 shows the battery seen in FIG. 17 embedded in a lightweight portable computer in accordance with the described embodiments.

FIG. 18 shows a representation of portable computer 1800 in accordance with the described embodiments. Portable computer 1800 can include a computer assembly placed within enclosure 1702. The computer assembly can include various operational components that can cooperate to provide the functionality of portable computer 1800. Moreover, in addition to performing their designed function, some of the operational components can be used to enhance the ability of inner layer 1704 to transfer and distribute loads as well as augment the stiffness of outer layer 1708. For example, a load path can be created between front portion 1712 and rear portion 1714 using load bearing internal component 1802. For example, load bearing internal component 1802 can be attached to inner layer 1704 using connector 1804 and rear frame 1718 using connectors 1806. In this way, load L can be transferred to either the structural support layer by way of connectors 1804 and/or rear frame 1718 by way of connectors 1806. For example, load L can be thought of as having three spatial components, $\{L_x, L_y, L_z\}$. Spatial component $L_z$ can be transferred by way of connector 1804 to the structural support layer whereas spatial component $L_y$ can be transferred to rear frame 1718 by way of connector 1806. In contrast to load bearing components, non-load bearing component 1808 can be attached to inner layer 1704 and rear frame 1718 by way of load absorbing connectors 1810. Load absorbing connectors 1810 can be used to load isolate non-load bearing component 1808 using any number and type of load absorbing materials such as soft plastic.

Rear frame 1718 can be used to support components such as main logic board (MLB) 1812. Components such as MLB 1812 cannot tolerate much, if any, flexing due in part, to the relatively large number of surface mounted devices included in MLB 1812 that can be susceptible to the bending or flexing of the printed circuit board (or PCB) onto which the devices are mounted. Rear frame 1718 can be attached to outer layer 1708 using adhesive such as load absorbing adhesive 1710.

Figure 19:
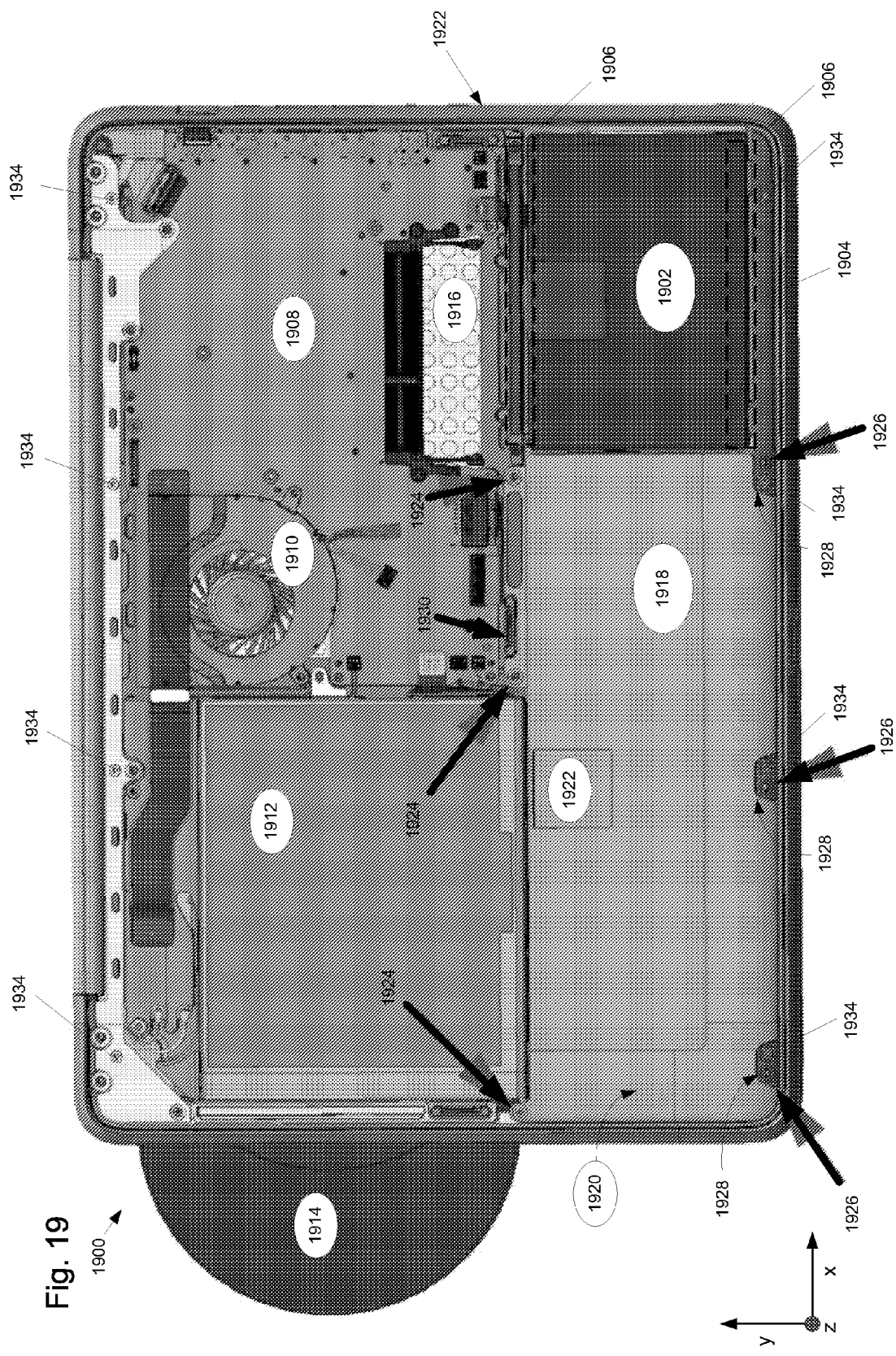
FIG. 19 shows a portable computing system in accordance with the described embodiments.

FIG. 19 shows portable computer 1900 in accordance with a particular embodiment of the generalized representation of portable computer 1800 shown in FIG. 18. Portable computer 1900 can include a number of operational components. Some of the operational components can be non-load bearing such as hard disk drive, or HDD, 1902 attached to front frame 1904 by way of load isolating connector 1906. Components that cannot tolerate much bending or flexing such as, for example, as MLB 1908, fan 1910, and optical disc drive (ODD) 1912 configured to accommodate optical disk 1914 can be mounted to rear frame 1916. Rear frame 1916 can be formed of metal such as magnesium or magnesium alloy. Battery assembly 1918 can include battery housing 1920 that encloses and supports a number of battery cells and associated circuits. Furthermore, battery assembly 1918 can also include pull tab 1922 used to assist in removing battery assembly 1918 from portable computer 1900. It should be noted that in order to enhance the structural integrity of battery assembly 1918 and its ability to handle external loads, battery housing 1920 can be formed of a single piece of material such as plastic along the lines of PCABS. Battery assembly 1918 can have a form and composition that can be mechanically coupled to and thereby add to the stiffness of outer layer 1922. Moreover, battery assembly 1918 can be made part of a load path between rear frame 1916 and front frame 1904.

Battery assembly 1918 can be attached to rear frame 1916 at connectors 1924 using a suitable fastener. In the particular embodiment shown in FIG. 19, the fastener used to attach battery assembly 1918 to rear frame 1916 can take the form of tamper resistant fastener 104 described above. Battery assembly 1918 can be attached to front frame 1904 at connector 1926 located on attachment feature 1928 using a suitable fastener such as a screw. In this case, battery housing 1920 can include holes, or bosses, suitably configured to accept the fastener used to secure battery assembly 1918 to front frame 1904. When the screw is tightened, battery assembly 1918 can move in the Z direction resulting in appropriately shaped recess portion formed in battery housing 1920 to engage attachment feature 1928. This movement also brings restricted Z type connector 1930 (also referred to as a lollipop connector) into position to couple with a corresponding lip formed on the inside surface of the structural support layer.

Battery assembly 1918 can be secured to rear frame 1916 by tightening the tamper proof fasteners at connectors 1924. Battery assembly 1914 can be secured to front frame 1904 by tightening the fasteners at connector 1926 in attachment feature 1928. The structural support layer can then be secured to front frame 1904 and rear frame 1916 by using fasteners such as screws at connectors 1934. In this way, battery assembly 1918 can facilitate the transfer and distribution of load L in any spatial coordinate. For example, battery assembly 1918 can, as part of the load path, facilitate the transfer of load L having spatial coordinates $\{L_x, L_y, L_z\}$ to the structural support layer ($L_x$) by way of fasteners at connectors 1934 and connector 1930 or rear frame 1916 ($L_y$) using fasteners at connectors 1924. Once installed, battery assembly 1918 can be secured to front frame 1904 at connector 1926 included in attachment feature 1928 and at rear frame 1912 and by way of fasteners at connectors 1924. Furthermore, by shaping battery housing 1920 to conform to the contours of interior surface of front frame 1904, a tighter, more integrated fit and cleaner more appealing appearance can be presented.

Battery assembly 1918 can be placed within portable computer 1900 such a way that when the structural support layer is removed, battery housing 1920 can be exposed to the external environment. Accordingly, battery housing 1920 can be formed of a durable material, such as high impact plastic or other suitably rugged yet lightweight material. For example, battery housing 1920 can be injection molded plastic, such as PCABS. In some embodiments, battery housing 1920 can have a thickness in a range of about 0.35-1.3 mm with nominal thickness being about 0.65 mm. The durable material of the battery housing 1920 is capable of protecting the battery cells from incidental damage.

Figure 20:
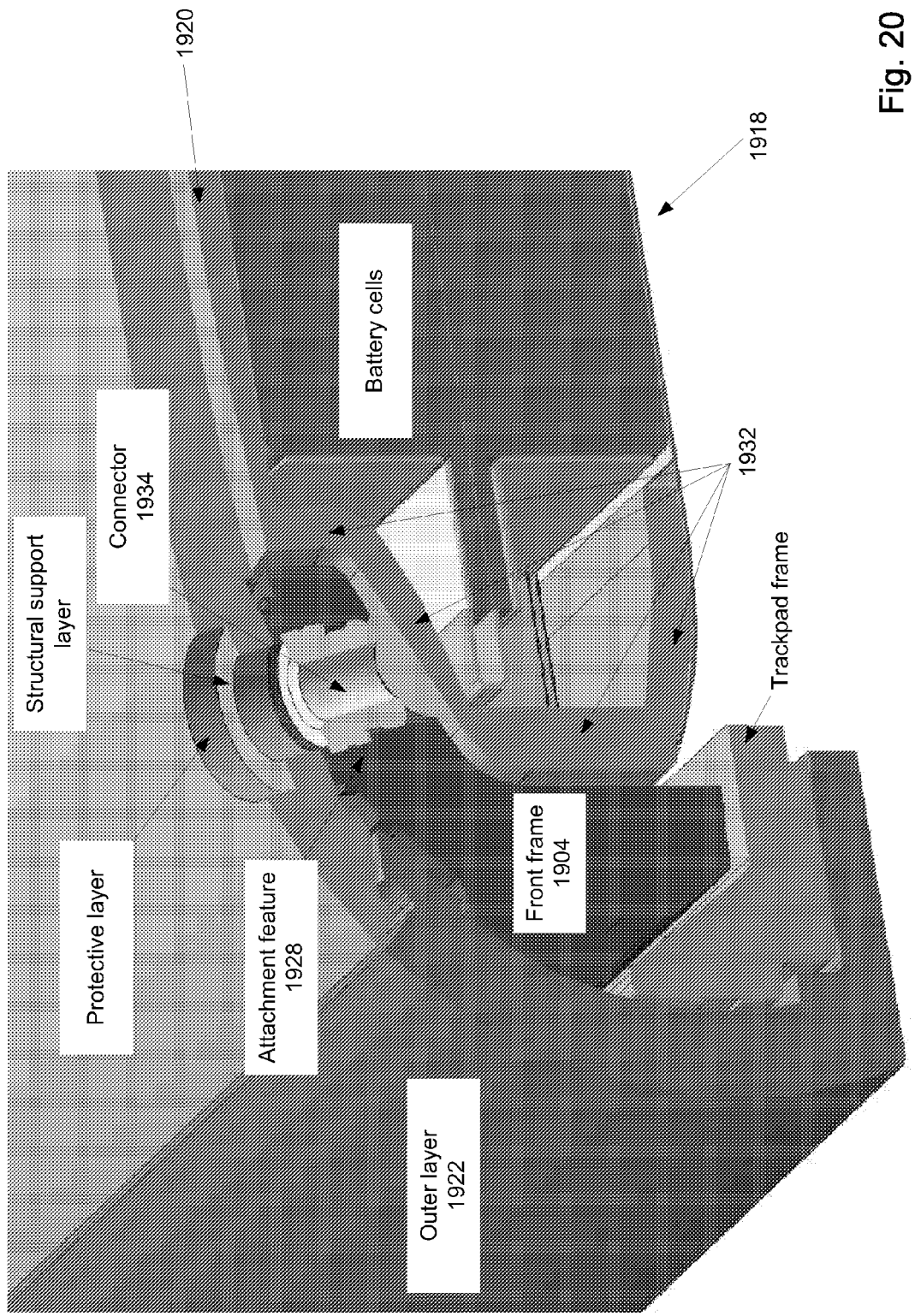
FIG. 20 shows a cross section of a battery cover attached to a front frame in accordance with the described embodiments.

As shown in more detail in FIG. 20, battery housing 1920 can have a front portion with an external shape that can conform to the contour (such as an undercut shape) of front frame 1904 that, in turn, can conform to the shape of an interior surface of outer layer 1922. For example, battery housing 1920 can have front portion 1932 shaped to conform with and therefore fit into the interior surface of front frame

1904. Front frame 1904, in turn, can fit into the shape presented by the interior surface of outer layer 1922. In this way, battery assembly 1918 can be installed by being dropped into enclosure 1702 and then placed using a dive like motion where front portion 1932 can be placed into the accommodating space formed by interior surface of front frame 1904 then lowered into place next to rear frame 1916. The close fit provided by the conforming shapes of front frame 1904 and front portion 1932 can provide a much tighter fit and cleaner appearance. Moreover, the placing front frame 1916 into the concave recess formed the outer layer 1922, the structural stability of outer layer 1922 can be enhanced since front frame 1904 essentially becomes part of outer layer 1922. In this way, both the stiffness of battery assembly 1918 and front frame 1904 can be added to that of outer layer 1922 without adding any more weight than would otherwise be required.

Figure 21:
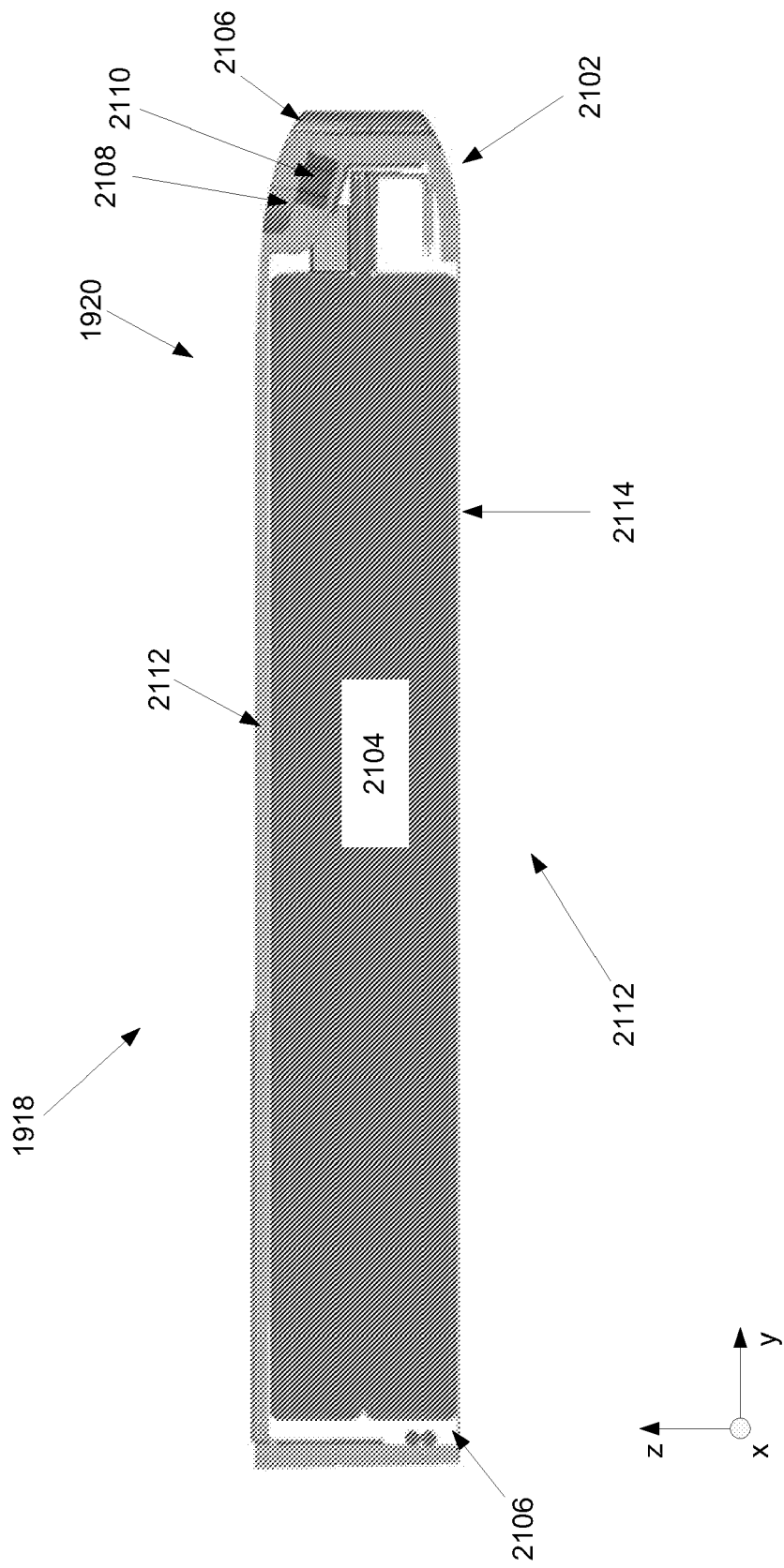
FIGS. 21-22 show various prospective and cross sectional views of battery assembly in accordance with the described embodiments.
Figure 22:
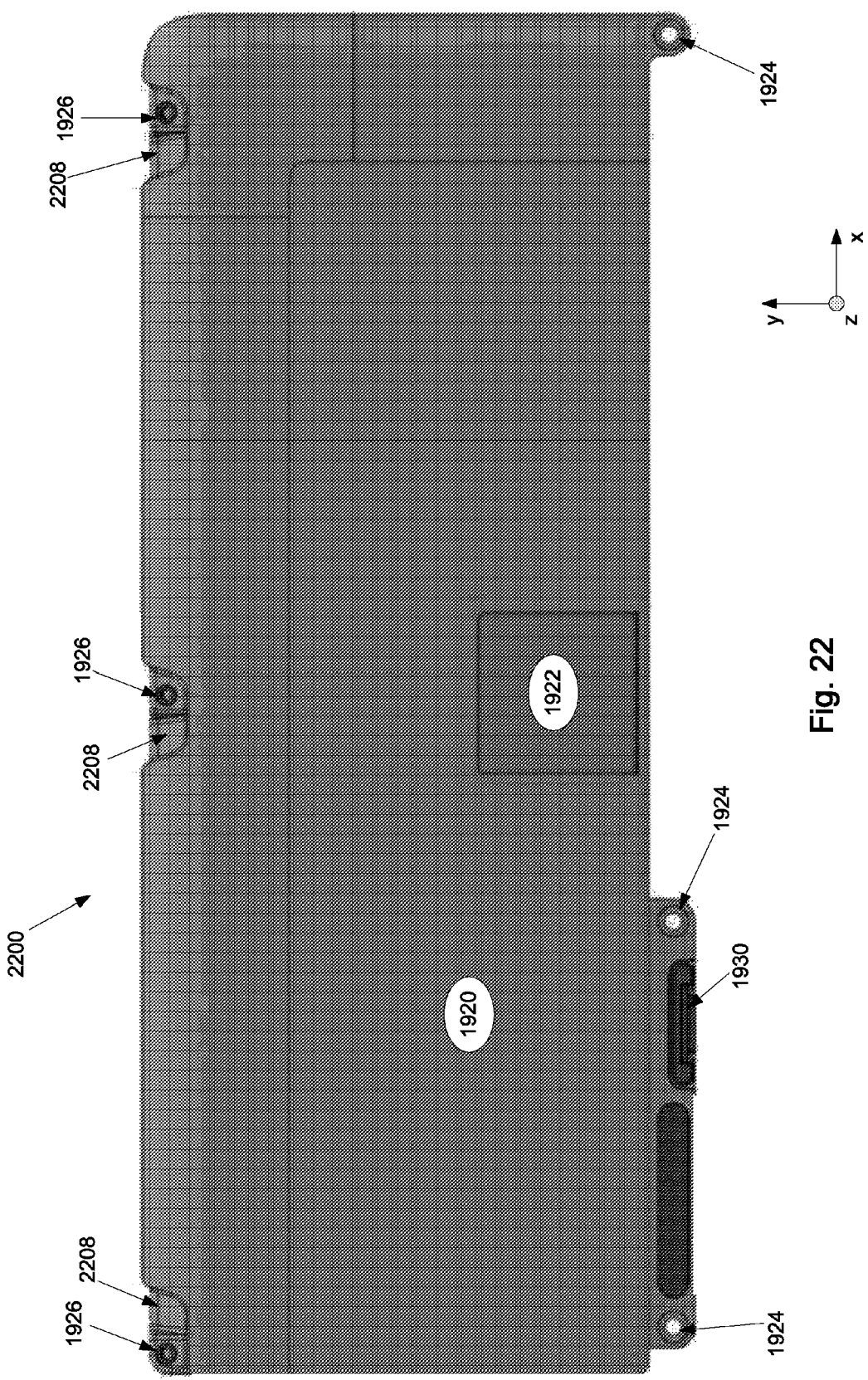

FIGS. 21-22 show various perspective and cross sectional views of battery assembly 1918 in accordance with the described embodiments. FIG. 21 shows a representative cross sectional view of battery assembly 1918 showing single piece battery housing 1920. As shown, battery housing 1920 has a "C" shaped cross section that includes portion 2102 shaped to act as a cantilever beam that can increase the stiffness of battery housing 1920 even in the absence of battery cells (or core pack) 2104. However, with battery cells 2104 placed within enclosure 2106 supported by C shaped portion 2102 and taped into place using VHB provided by protective layer 2114, the stiffness of battery assembly is greatly increased. Battery assembly 1918 can be connected to both front frame 1904 and rear frame 1916. In this way, battery assembly can substantially increase the stiffness of outer layer 1922 as well facilitate the transfer of load L between front frame 1904, rear frame 1916 and the structural support layer.

Recess portion 2108 can include boss 2110 that can receive a fastener such as a screw used to secure battery assembly to front frame 1904. As noted above, recess portion 2108 can be shaped to accommodate attachment feature 1928 such that upper surface 2112 of battery housing 1920 can move in the Z direction when the fastener is tightened. Since bottom portion 2112 of battery assembly 1918 is protected by outer layer 1922, the Z stack of battery assembly 1928 can be preserved by providing protective layer 2114 at bottom portion 2112 of battery assembly 1928. Protective layer 2114 can be formed of thin and lightweight material such as MYLAR (a polyester film). Since the bottom of battery assembly 1918 is protected by the top case, VHB (very high bond) adhesive is used to attach protective layer 2114 to core pack 2104 and C shaped portion 2102.

FIG. 22 shows a top view of battery assembly 1918. According to an embodiment, the battery cell or cells within the battery assembly 1918 can have a customized size and shape designed to fit inside a computer housing having a thin profile. The thickness of a conventional battery assembly is typically dictated by the diameter of the cylindrical lithium-ion cells contained within the battery assembly. Also, the space between the cylindrical cells is wasted in a conventional battery assembly. However, the battery cells, according to this embodiment, can be customized such that there is no wasted space between cells and the thickness of each cell can be customized to fit in the designated space within battery assembly 1918, thereby maintaining the overall volume of the battery cells even through the cells are thinner.

Figure 23:
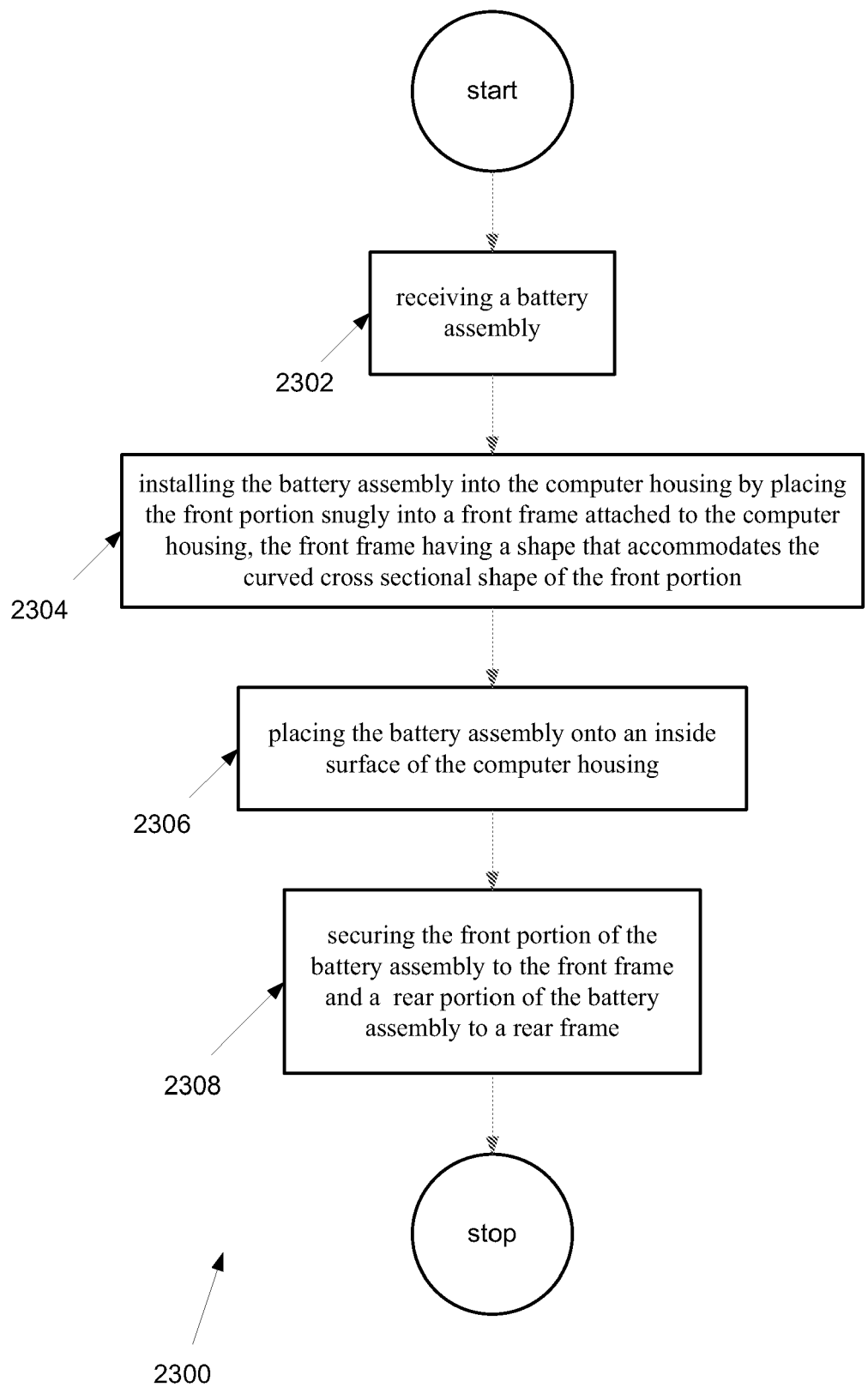
FIG. 23 shows a flowchart detailing a process in accordance with the described embodiments.

FIG. 23 shows a flowchart detailing process 2300 for embedding a battery assembly into a portable computer having a computer housing formed of flexible material. Process 2300 can be carried out by performing at least the following operations. At 2302, receiving the battery assembly, the battery assembly comprising: a single piece battery housing arranged to enclose a plurality of battery cells, the battery housing having a front portion having a curved cross sectional shape, a top portion, a cantilever beam portion, and a minimum Z impact protective layer, the cantilever beam portion being integrally formed along a lower edge of the top portion arranged to increase a resistance to flexing of the battery housing, the protective layer being attached to the cantilever beam portion and the battery cells by way of a high bond strength adhesive. At 2304, installing the battery assembly into the computer housing by placing the front portion snugly into a front frame attached to the computer housing, the front frame having a shape that accommodates the curved cross sectional shape of the front portion. At 2306, placing the battery assembly onto an inside surface of the computer housing such that the protective layer is placed in contact with the inside surface such that the computer housing provides a substantial portion of the protection provided to the battery cells. At 2308, securing the front portion of the battery assembly to the front frame such that a load applied to the computer housing is transferred by way of a load path to a structural support layer connected to the computer housing without substantially affecting the computer housing, the load path including the battery assembly.

The advantages of these embodiments are numerous. Different aspects, embodiments or implementations may yield one or more of the following advantages. One advantage is that the battery assembly is not readily accessible to any but an authorized user. The battery assembly can be shaped to provide additional stiffness to a computer housing having little or no inherent stiffness. In this way, lightweight materials such as plastic can be used for computer housings.

The many features and advantages of the described embodiments are apparent from the written description and, thus, it is intended by the appended claims to cover such features and advantages. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing device, comprising:
   a flexible housing;
   a load transferring inner frame;
   a load absorbing layer arranged to mechanically couple the housing and the inner frame;
   a structural support layer connected to the load transferring inner frame; and
   a battery assembly mechanically connected to the load transferring inner frame, wherein when a load is applied to the flexible housing, the applied load is transferred by way of a load path to the structural support layer without substantially affecting the flexible housing, wherein the load path includes the battery assembly, the battery assembly comprising:
   a single piece battery housing configured to provide structural support to battery components included therein, the single piece housing formed of durable material, wherein the single piece battery housing comprises:
   a top portion, the top portion arranged to provide protection to a plurality of battery components and to provide connectors for securing the battery to the housing, and
   a cantilever beam portion, the cantilever beam portion integrally formed with the top portion and extending along a lower edge of the top portion, the cantilever beam portion enhancing a resistance to flexing of the battery housing; and a lightweight minimum Z stack impact bottom layer attached to the cantilever beam portion and at least some of the battery components by way of a high bond adhesive, the lightweight bottom layer having a thickness that does not substantially impact the Z stack of the battery assembly.

2. The computing device as recited in claim 1, wherein battery assembly is attached to the inner frame by at least one tamper-resistant fastener that can be manipulated only by a customized tool.

3. The computing device as recited in claim 2, wherein the battery assembly includes at least one specially shaped recess arranged to accommodate the at least one tamper-resistant fastener in such a way as to allow meaningful access to the at least one tamper resistant fastener only with a customized tool.

4. The computing device as recited in claim 1, further comprising an electrical connector arranged to electrically connect circuits external to the battery assembly with circuits and battery cells internal to the battery assembly.

5. The computing device as recited in claim 1, wherein the minimum Z stack impact bottom layer has a thickness of about 0.1 mm.

6. The computing device as recited in claim 5, wherein the minimum Z stack impact bottom layer comprises MYLAR.

7. The computing device as recited in claim 5, wherein the protective layer comprises stainless steel.

8. The computing device as recited in claim 1, wherein the computer housing includes a plurality of frame members attached to an inside surface of the computer housing.

9. The computing device as recited in claim 8, wherein the high bond adhesive is VHB.

10. The computing device as recited in claim 8, wherein the plurality of frame members includes a rear frame.

11. The computing device as recited in claim 10, wherein at least one of the connectors used to secure the battery assembly to the computer housing by way of the rear frame is a tamper resistant fastener.

* * * * *

UNITED STATES PATENT AND TRADEMARK OFFICE
CERTIFICATE OF CORRECTION

| | | |
|---|---|---|
| PATENT NO. | : 8,199,469 B2 | Page 1 of 1 |
| APPLICATION NO. | : 12/580976 | |
| DATED | : June 12, 2012 | |
| INVENTOR(S) | : Robert L. Coish et al. | |

It is certified that error appears in the above-identified patent and that said Letters Patent is hereby corrected as shown below:

In the Claims:

Column 16, line 61: "piece housing" should read --piece battery housing--.

Column 18, line 11: "computer housing" should read --flexible housing--.

Column 18, line 12: "computer housing" should read --flexible housing--.

Column 18, line 19: "computer housing" should read --flexible housing--.

Signed and Sealed this
Thirtieth Day of December, 2014

Michelle K. Lee
*Deputy Director of the United States Patent and Trademark Office*